US011450351B1

(12) United States Patent
El Ghazzal

(10) Patent No.: US 11,450,351 B1
(45) Date of Patent: Sep. 20, 2022

(54) DYNAMIC AND INTELLIGENT VIDEO EDITOR

(71) Applicant: META PLATFORMS, INC., Menlo Park, CA (US)

(72) Inventor: Sammy El Ghazzal, Nigristweg (CH)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/370,695

(22) Filed: Jul. 8, 2021

(51) Int. Cl.
| | |
|---|---|
| *G11B 27/031* | (2006.01) |
| *H04N 21/234* | (2011.01) |
| *H04N 21/258* | (2011.01) |
| *H04N 21/845* | (2011.01) |
| *H04N 21/442* | (2011.01) |
| *G06V 20/40* | (2022.01) |

(52) U.S. Cl.
CPC ........... *G11B 27/031* (2013.01); *G06V 20/41* (2022.01); *G06V 20/49* (2022.01); *H04N 21/23424* (2013.01); *H04N 21/25891* (2013.01); *H04N 21/44204* (2013.01); *H04N 21/8456* (2013.01)

(58) Field of Classification Search
CPC ............ G11B 27/031; G06K 9/00718; G06K 9/00765; H04N 21/23424; H04N 21/25891; H04N 21/44204; H04N 21/8456
See application file for complete search history.

(56) References Cited

U.S. PATENT DOCUMENTS 9,465,435 B1 * 10/2016 Zhang .............. H04N 21/42201
2020/0382834 A1 * 12/2020 Gupta ................ H04N 21/8455

OTHER PUBLICATIONS

Web Page <en.wikipedia.org/wiki/Knapsack_problem>, "Knapsack Problem", retrieved Jul. 6, 2021, 8 pages.

* cited by examiner

*Primary Examiner* — Mishawn N. Hunter
(74) *Attorney, Agent, or Firm* — Jordan IP Law, LLC

(57) ABSTRACT

Systems, apparatuses and methods may provide technology that identifies categories that are related to subject matter content of a plurality of videos and associated with different categorization signals. The technology categorizes a first video among the plurality of videos as being within a first category of the categories based on the different categorization signals, segments the first video into segments based on the categorization of the first video as being within the first category, and identifies engagement signals associated with the first video, where the engagement signals are associated with actions of viewers that viewed the first video. The technology further conducts an analysis of the segments based on the engagement signals and automatically generates a final video that includes one or more of the segments and omits at least one segment of the segments based on the analysis.

14 Claims, 17 Drawing Sheets

DYNAMIC AND INTELLIGENT VIDEO EDITOR

TECHNICAL FIELD

Embodiments generally relate to artificial intelligence (AI) and/or machine learning based video analysis, segmentation, and selection. More specifically, embodiments relate to systems, apparatuses and methods for automated scoring and selection of segments of a video to reduce video latency while maintaining meaningful content.

BACKGROUND

With recent advances in computing technology, vast quantities of digital content are being distributed throughout the internet. Not all of the content is relevant to a particular user. When a user realizes that such content is irrelevant, they may skip, or fast forward portions of the content, resulting in inefficiency at several levels (e.g., hardware and bandwidth used to stream and store undesired content). Furthermore, users may lose interest in content if they view portions of the content as being uninteresting or irrelevant, even if other portions of the content are relevant or interesting. This may pose unique challenges for content providers, internet-service providers and entities that host online listings.

SUMMARY

Some embodiments relate to at least one computer readable storage medium comprising a set of instructions, which when executed by a computing device, cause the computing device to identify categories that are related to subject matter content of a plurality of videos and associated with different categorization signals. The instructions, when executed, cause the computing device to categorize a first video among the plurality of videos as being within a first category of the categories based on the different categorization signals, segment the first video into segments based on the categorization of the first video as being within the first category, identify engagement signals associated with the first video, where the engagement signals are associated with actions of viewers that viewed the first video, conduct an analysis of the segments based on the engagement signals and automatically generate a final video that includes one or more segments and omits at least one segment of the segments based on the analysis.

Some embodiments relate to a system comprising one or more processors, and a memory coupled to the processors. The memory comprises instructions executable by the one or more processors. The one or more processors are operable when executing the instructions to identify categories that are related to subject matter content of a plurality of videos and associated with different categorization signals, categorize a first video among the plurality of videos as being within a first category of the categories based on the different categorization signals, segment the first video into segments based on the categorization of the first video as being within the first category, identify engagement signals associated with the first video, where the engagement signals are associated with actions of viewers that viewed the first video, conduct an analysis of the segments based on the engagement signals and automatically generate a final video that includes one or more segments and omits at least one segment of the segments based on the analysis.

Some embodiments relate to a method for identifying categories that are related to subject matter content of a plurality of videos and associated with different categorization signals and categorizing a first video among the plurality of videos as being within a first category of the categories based on the different categorization signals. The method further segments the first video into segments based on the categorization of the first video as being within the first category, identifies engagement signals associated with the first video, where the engagement signals are associated with actions of viewers that viewed the first video, conducts an analysis of the segments based on the engagement signals and automatically generates a final video that includes one or more segments and omits at least one segment of the segments based on the analysis.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

A hosting entity (e.g., a computing device, server, mobile device, etc.) may be responsible for hosting content. In response to a query or request, the hosting entity may provide content (e.g., a stream of information such as a video). In order to host and stream the content, the entity may consume a vast amount of computing resources that increases with the amount of content (which may number in the millions). For example, the hosting entity will consume storage space (e.g., memory, hard-drive space, solid-state drive) to store the content. Moreover, in order to transmit the content to an end user, the content may need to be prepared (e.g., compressed, encoded, etc.), modified into packets, etc. in order to transmit the content. The preparation consumes computing resources.

In one example, a user may request a video from the hosting entity. The hosting entity may respond by providing the video over an internet connection to a user device. The user device may buffer and present the video to the user. If the user finds a first portion of the video interesting and/or irrelevant, the user may bypass the buffered content and jump to a second portion of the video. Thus, the buffered content was unnecessarily prepared for transmission, thereby unnecessarily consuming hardware resources by the content provider. Moreover, the buffered content unnecessarily consumes bandwidth in order to be transferred, and hardware resources of the user device (e.g., decoding resources on the user device, network resources, memory space on the user device). Furthermore, the above consumes processing power in order to prepare, transmit and store the buffered content.

Embodiments herein are related to an enhanced process to select and provide relevant content to a user. Doing so may enhance efficiency by providing content a user may find relevant, thus reducing the amount of unneeded content (e.g., content that a user will likely bypass, not view and/or find uninteresting) that is transmitted and reducing the amount of computing resources and power. Thus, computing resources may be more efficiently allocated and utilized since at least some unneeded content no longer consumes bandwidth, power, memory, and computing resources.

Thus, transmitting relevant content and bypassing irrelevant content for transmission beneficially reduces utilization of computing resources and enhances efficiency. As such, some embodiments relate to automatically segmenting a video, scoring the segments for relevance, and providing relevant segments to a user. For example, selection of the relevant segments may be specifically designed to reduce an amount of content that is provided but not desired by the user. Doing so provides several technical enhancements, including reducing processing power, an amount of storage space to buffer the video (since more irrelevant content may not be stored at a user device) and bandwidth to transmit relevant portions of the video.

Figure 1A:
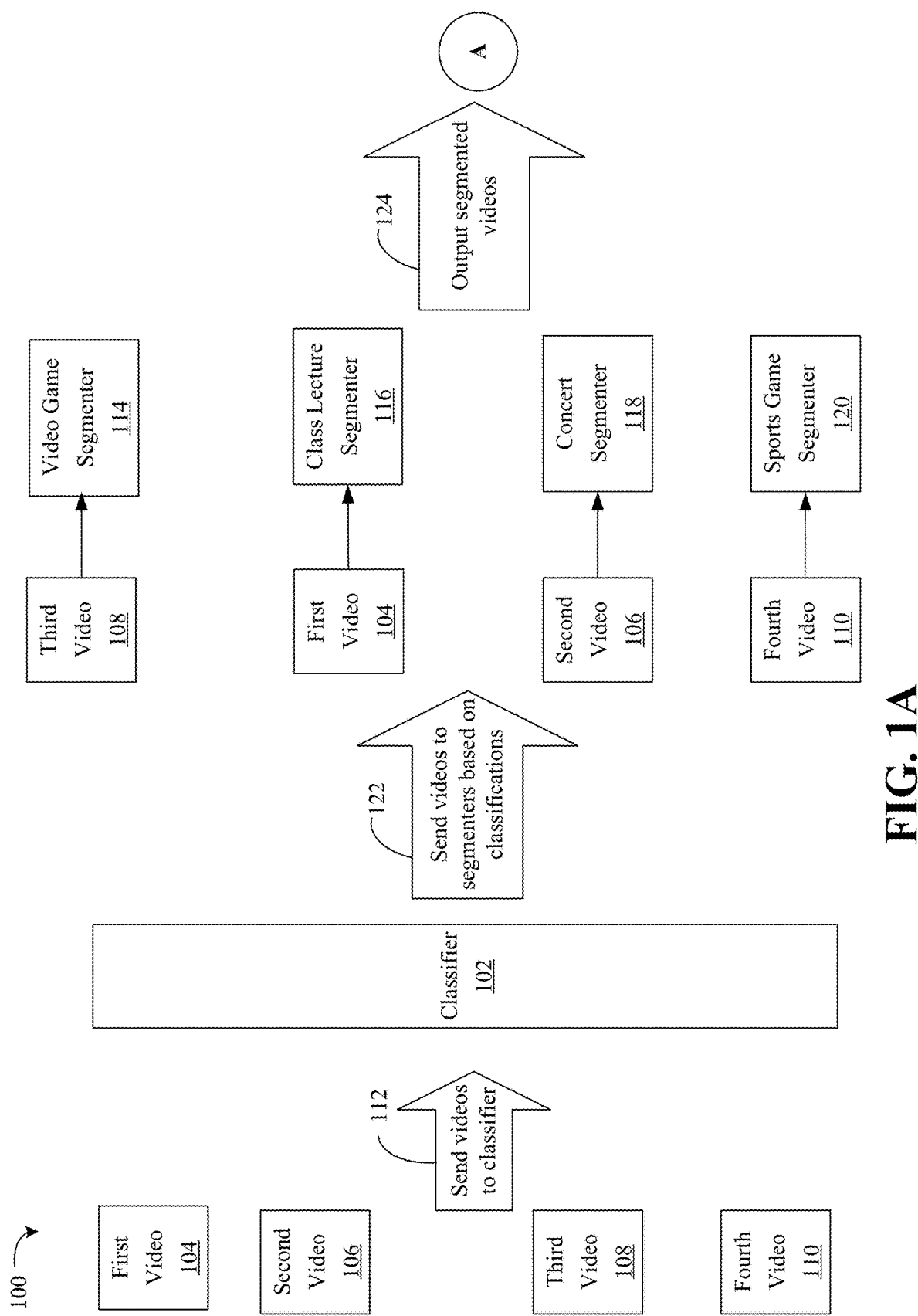
FIGS. 1A, 1B and 1C are a process of an example enhanced video segmentation and selection according to an embodiment.
Figure 1B:
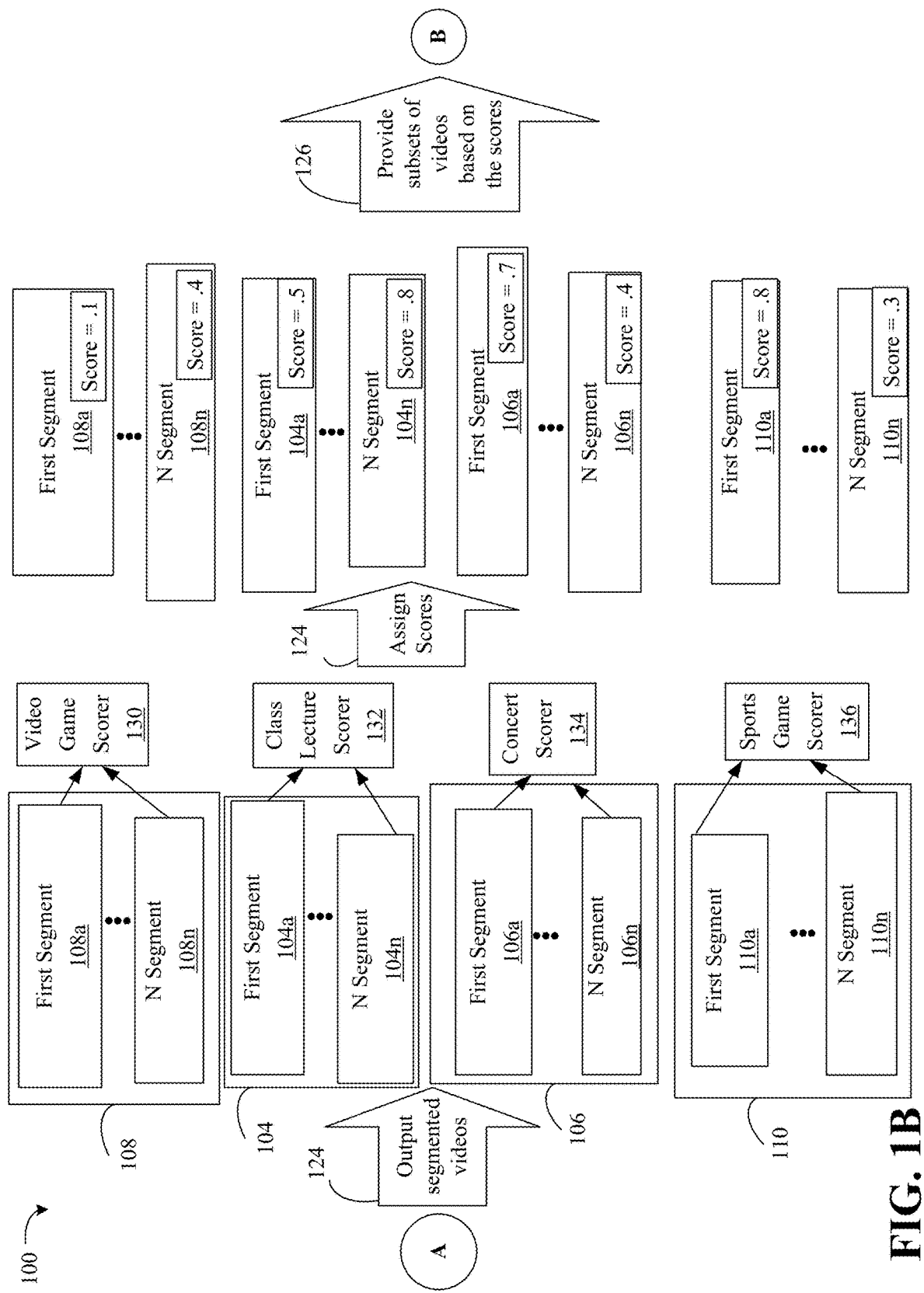
Figure 1C:
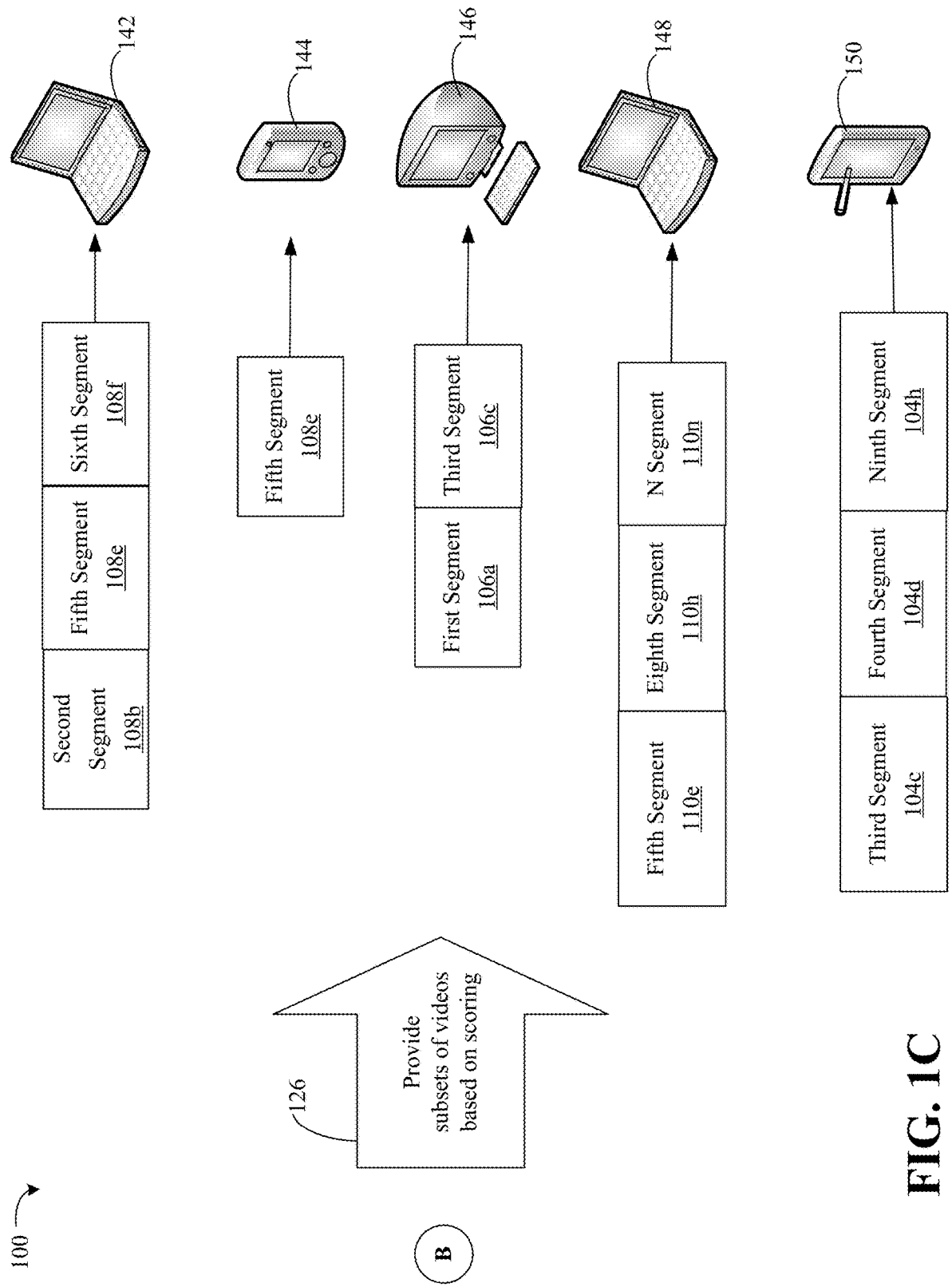

Turning to FIGS. 1A-1C, an enhanced video segmentation and selection process 100 is illustrated. The process 100 may identify relevant segments of a video and provide them to a user while bypassing transmission of irrelevant segments of the video. As noted above, doing so may enhance reduce computing resources, bandwidth, and processing power to provide videos to users.

In detail, a process 100 may send videos to classifier 102, 112. The classifier 102 may be executed in software, hardware, or combinations thereof. The classifier 102 may classify a first video 104, a second video 106, a third video 108 and a fourth video 110 based on categorization signals (e.g., audio and/or visual data and markers therein). The first video 104, the second video 106, the third video 108 and the fourth video 110 may have been uploaded to a hosting entity. The hosting entity may execute the classifier 102. The classifier 102 may classify the first video 104, the second video 106, the third video 108 and the fourth video 110 based on subject matter content. As will be explained below, the subject matter classification of the classifier 102 may guide segmentation and scoring of the first video 104, the second video 106, the third video 108 and the fourth video 110.

As noted, the classifier 102 may classify the first video 104, the second video 106, the third video 108 and the fourth video 110 based on the subject matter. For example, the classifier 102 may detect audio and visual aspects of the first video 104, the second video 106, the third video 108 and the fourth video 110. The classifier 102 may determine subject matter groupings of the first video 104, the second video 106, the third video 108 and the fourth video 110 based on the aspects.

For example, the third video 108 may have a visual feed and and/or audio feed related to gaming. For example, the visual feed may include objects (e.g., a game console, a game controller, a video game, etc.), actions (e.g., an actor pushing on buttons, movements of game characters, etc.) and/or other visual cues (e.g., digital graphics, art of known games, etc.) related to game play (e.g., "gaming"). The audio feed may include comments (e.g., noob, adds, bots, camping, etc.) and/or music related to gaming. The classifier 102 may classify the third video 108 based on the visual and/or audio feed so that the third video 108 is classified as a video game.

The first video 104 may have a visual feed and and/or audio feed related to a class lecture. For example, the visual feed may include objects (e.g., a projector, white board, etc.), actions (e.g., people in attendance raising hands to ask questions, people in attendance focused on a speaker, etc.) and/or other visual cues (e.g., slides, etc.) related to a class lecture. The audio feed may include comments (e.g., "teacher I have a question," "professor," "what time is office hours," etc.) and discussion related to class lectures. The classifier 102 may classify the first video 104 based on the visual and/or audio feed so that the first video 104 is classified as a class lecture.

The second video 106 may have a visual feed and and/or audio feed related to a concert. For example, the visual feed may include objects (e.g., musical instruments, microphone, a stage, and people on the stage, etc.), actions (e.g., people in attendance dancing and singing, people in attendance focused on the musicians, etc.) and/or other visual cues (e.g., identification of a conductor, etc.) lights related to a concert (e.g., "concerts"). The audio feed may have little to no commentaries (e.g., little to no audience noise except during intermission) and music except during intermission. The classifier 102 may classify the second video 106 based on the visual and/or audio feed so that the second video 106 is classified as a concert.

The fourth video 110 may have a visual feed and and/or audio feed related to a sports event. For example, the visual feed may include objects (e.g., soccer ball, soccer shoes, hockey sticks, hockey puck, ice, football, basketball, etc.), actions (e.g., players passing a ball or puck, players using their hands and/or feet to play with a ball, hockey sticks hitting a hockey puck, etc.) and/or other visual cues (e.g., a touch lines, side lines, goal lines, end lines, center line, three point line, an identification of a referee, etc.). The audio feed may have sports related commentaries and analysis (e.g., "free throws," "penalty kick," famous player names, etc.). The classifier 102 may classify the fourth video 110 based on the visual and/or audio feed so that the fourth video 110 is classified as a sports event.

The classifier 102 thus operates to classify the first video 104, the second video 106, the third video 108 and the fourth video 110 based on subject matter. Doing so enables the first video 104, the second video 106, the third video 108 and the fourth video 110 to be segmented properly. That is, the first video 104, the second video 106, the third video 108 and the fourth video 110 are segmented differently based on a classification of the subject matter within the first video 104, the second video 106, the third video 108 and the fourth video 110 and classification signals thereof.

As illustrated, the process 100 includes a video game segmenter 114, a class lecture segmenter 116, a concert segmenter 118 and a sports game segmenter 120. The video game segmenter 114, the class lecture segmenter 116, the concert segmenter 118 and the sports game segmenter 120 may be machine learning models that operate to segment videos differently from each other based on different markers (audio or visual cues). Thus, hypothetically, outputs (segments of a same video) of the video game segmenter 114, the class lecture segmenter 116, the concert segmenter 118 and the sports game segmenter 120 based on the same video would be different from each other.

As illustrated, the process 100 sends videos (first video 104, second video 106, third video 108 and fourth video 110) to segmenters (a video game segmenter 114, a class lecture segmenter 116, a concert segmenter 118 and a sports game segmenter 120) based on the classifications 122 by the classifier 102. Thus, the third video 108 may be assigned and provided to the video game segmenter 114, the first video 104 is assigned and provided to the class lecture segmenter 116, the second video 106 is sent to the concert segmenter 118 and the fourth video 110 is sent to the sports game segmenter 120.

The video game segmenter 114, the class lecture segmenter 116, the concert segmenter 118 and the sports game segmenter 120 may segment the first video 104, the second video 106, the third video 108 and the fourth video 110 based on adjustability granularity parameters. The granularity parameters may be determined based on length of a video to be segmented (e.g., longer videos are segmented into longer clips), an age of a video (e.g., older videos may lose relevance and are segmented into shorter clips to provide brief overview segments to summarize the video), etc. The granularity parameter will be discussed in further detail below.

The video game segmenter 114 may analyze and segment the third video 108 to generate a plurality of smaller segments that when combined, are representative of the entire third video 108. For example, the video game segmenter 114 may detect game video specific characteristics to detect potential break points (e.g., cut scenes, drastic change in video character actions, audience cheering, player comments indicating changes in action, etc.) in the third video 108. Segments may be assigned between the break points.

The class lecture segmenter 116 may analyze and segment the first video 104. For example, the class lecture segmenter 116 may detect class specific characteristics to segment the first video 104, such as breaks in speaking by a lecturer, erasing a white board, audience questions, etc. that denote different topics or segments.

The concert segmenter 118 may analyze and segment the second video 106. For example, the concert segmenter 118 may detect concert specific characteristics to segment the second video 106, such as breaks in music playing, speaking, audience murmuring, etc. that denote different songs, breaks or segments.

The sports game segmenter 120 may analyze and segment the fourth video 110. For example, the sports game segmenter 120 may detect sports specific characteristics to segment the fourth video 110, such as breaks in sports play, audience cheering, beginning of set plays, ball is out of bounds, ball re-enters play, injury time out, etc. that denote different types of actions or segments.

The video game segmenter 114, the class lecture segmenter 116, the concert segmenter 118 and the sports game segmenter 120 output the segmented videos 124. Turning to FIG. 1B, the third video 108, the first video 104, the second video 106 and the fourth video 110 may be composed of and segmented into a plurality of segments. In detail, the first video 104 may be composed of and represented entirely by first segment 104a-N segment 104n, the second video 106 may be composed of and represented entirely by first segment 106a-N segment 106n, the third video 108 may be composed of and represented entirely by first segment 108a-N segment 108n and the fourth video 110 may be composed of and represented entirely by first segment 110a-N segment 110n. It will be understood that the number of the first segment 104a-N segment 104n, the number of the first segment 106a-N segment 106n, the number of the first segment 108a-N segment 108n and the number of the first segment 110a-N segment 110n may be any number greater than one and different from each other.

The video game scorer 130, class lecture scorer 132, concert scorer 134 and sports game scorer 136 may provide scores indicating relevance and according to subject matter. In this example, a score is in a 0-1.0 scale, where 1.0 is very interesting and 0.0 is not interesting at all. Thus, the scores are proportional to relevance and/or levels of interest. The video game scorer 130, class lecture scorer 132, concert scorer 134 and sports game scorer 136 operate differently from each other and based on different audio and visual cues that are relevant for a particular type of subject matter. Thus, hypothetically outputs (scores of the same segments) of the video game segmenter 114, the class lecture segmenter 116, the concert segmenter 118 and the sports game segmenter 120 based on the same segments would be different from each other. The video game segmenter 114, the class lecture segmenter 116, the concert segmenter 118 and the sports game segmenter 120 may be implemented as machine learning models, neural networks, etc.

The video game scorer 130, class lecture scorer 132, concert scorer 134 and sports game scorer 136 may receive engagement signals (explained below in further detail) from a plurality of viewers that view the first, second, third and fourth videos 104, 106, 108, 110. The engagements signals may be indicative of a level of interest in portions of the first, second, third and fourth videos 104, 106, 108, 110. Thus, the video game scorer 130, class lecture scorer 132, concert scorer 134 and sports game scorer 136 may determine scores of the first-N segments 104a-104N, 106a-106N, 108a-108N, 110a-110N based in part on the engagement signals. As such, some embodiments determine the scores based on a crowd-based analysis that is representative of overall preferences of numerous viewers, resulting in enhanced and accurate scoring.

The video game scorer 130 may score the first segment 108a-N segment 108n. For example, the video game scorer 130 may detect video game specific characteristics to score the third video 108. For example, suppose the third video 108 is a recording of a video game live streaming. In such a context, audio cues (e.g., cheering, clapping, an increase in audience noise, certain statements associated with exciting gameplay by a gamer, etc.) may be identified to determine relevance (e.g., an interest in the video, an importance) and identify relevant portions (higher scores) of the third video 108. In contrast, portions of the third video 108 that lack such audio cues may be deemed to be of less relevance (lower score).

The video game scorer 130 may further analyze the visual stream of the third video 108 to determine visual cues to determine whether a portion of the third video 108 is of relevance. For example, the video game scorer 130 may analyze the third video 108 and detect whether a live streamer (the person playing the video game) of the third video 108 exhibits characteristics indicating excitement (e.g., increased pupil dilation, increased hand and/or finger movements, change in sitting position from relaxed to agitated and/or excited). Further, the actual game play within the third video 108 may be analyzed to detect whether a portion is less relevant (e.g., repetitive action such as a main character running in a straight line across a gamescape with no enemies nearby, etc.) or more relevant (e.g., dynamic and quickly changing movements by the main character, an identified main boss is present, etc.) Thus, the video game scorer 130 assigns scores to the first segment 108*a*-N segment 108*n*.

In some examples, the video game scorer 130 may also identify engagement signals associated with third video 108. For example, the plurality of engagement signals is associated with actions of a plurality of viewers that viewed the third video 108. If a certain number of viewers skips and/or bypasses a portion of the third video 108, the video game scorer 130 may reduce the score of segment(s) of the first-N segments 108*a*-108*n* included in the skipped portion. In contrast, if a certain number of users rewind a portion of the third video 108, the video game scorer 130 may increase scores of segments of the first-N segments 108*a*-108*n* within the portion. Furthermore, if a certain number of users jump to a specific segment of the first-N segments 108*a*-108*n*, the video game scorer 130 may increase the score of the segment of the first-N segments 108*a*-108*n*. Other engagement signals may include commentaries (e.g., via social media or other platforms) about a particular action or portion of the third video 108. For example, if the particular action and/or commentary occurs in a specific segment of the first-N segments 108*a*-108*n*, the video game scorer 130 may increase the score of the specific segment of the first-N segments 108*a*-108*n*.

The class lecture scorer 132 may assign scores to the first-N segments 104*a*-104*n*. For example, the class lecture scorer 132 may analyze the visual stream of the first-N segments 104*a*-104*n* to determine visual cues to determine whether a segment of the first-N segments 104*a*-104*n* is of relevance. For example, the class lecture scorer 132 may analyze first-N segments 104*a*-104*n* and detect that a lecturer is emphatically using hand gestures, presenting slides, pointing to a white board, etc. within one or more of the first-N segments 104*a*-104*n* to determine that the one or more segments are relevant (increased score). In contrast, if during a segment of the first-N segments 104*a*-104*n*, the lecturer is executing an action that does not significantly contribute to the content of the lecture (e.g., erasing a white board, drinking water, tying shoe, etc.) the segment of the first-N segments 104*a*-104*n* may be deemed to be less relevant (lowered score).

Furthermore, the first video 104 may have an audio feed related to the class lecture. The audio feed may include comments. Segments of the first segment 104*a*-N segment 104*n* that include off-topic comments (e.g., "teacher I have a question," "professor," "what time is office hours," pauses in discussion, filler words, etc.) that may be deemed to be of less importance and thus segments that include such comments may have reduced scores. In contrast, segments that include on-topic comments (e.g., professor lecturing, etc.) may have higher scores.

In some examples, the class lecture scorer 132 may also identify engagement signals associated with first video 104. For example, the plurality of engagement signals is associated with actions of a plurality of viewers that viewed the first video 104. If a certain number of viewers skip and/or bypass a portion of the first video 104, the class lecture scorer 132 may reduce the score of segment(s) of the first-N segments 104*a*-104*n* included in the portion. In contrast, if a certain number of users rewind a portion of the first video 104, the class lecture scorer 132 may increase scores of segments of the first-N segments 104*a*-104*n* within the portion. Furthermore, if a certain number of users jump to a specific segment of the first-N segments 104*a*-104*n*, the class lecture scorer 132 may increase the score of the segment of the first-N segments 104*a*-104*n*. Other engagement signals may include commentaries (e.g., via social media or other platforms) about a particular action and/or questions on a certain portion of the first video 104. For example, if the particular action occurs and/or question corresponds to a specific segment of the first-N segments 104*a*-104*n*, the class lecture scorer 132 may increase the score of the specific segment of the first-N segments 104*a*-104*n*.

The concert scorer 134 may assign scores to the first-N segments 106*a*-106*n*. For example, the concert scorer 134 may analyze the visual stream of the first-N segments 106*a*-106*n* to determine visual cues to determine whether a segment of the first-N segments 106*a*-106*n* is of relevance. For example, the concert scorer 134 may increase the score of a segment of the first-N segments 106*a*-106*n* if certain visual cues (e.g., instruments being played, conductor leading a band, etc.) are present in the segment of the first-N segments 106*a*-106*n*. In contrast, the concert scorer 134 may decrease the score of a segment of the first-N segments 106*a*-106*n* if certain visual cues (e.g., instruments being put down and laying idle, conductor not facing towards band, etc.) are present in the segment of the first-N segments 106*a*-106*n*.

Furthermore, the second video 106 may have an audio feed related to the concert. The concert scorer 134 may increase the score of a segment of the first-N segments 106*a*-106*n* if certain audio cues (e.g., music being played, little to no discussion, etc.) are present in the segment of the first-N segments 106*a*-106*n*. The concert scorer 134 may decrease the score of a segment of the first-N segments 106*a*-106*n* if certain audio cues (e.g., no music, audience discussions, clapping, etc.) are present in the segment of the first-N segments 106*a*-106*n*.

In some examples, the concert scorer 134 may also identify engagement signals associated with second video 106. For example, the plurality of engagement signals is associated with actions of a plurality of viewers that viewed the second video 106. If a certain number of viewers skip and/or bypass a portion of the second video 106, the concert scorer 134 may reduce the score of segment(s) of the first-N segments 106*a*-106*n* included in the portion. In contrast, if a certain number of users rewind a portion of the second video 106, the concert scorer 134 may increase scores of segments of the first-N segments 106*a*-106*n* within the portion. Furthermore, if a certain number of users jump to a specific segment of the first-N segments 106*a*-106*n*, the concert scorer 134 may increase the score of the segment of the first-N segments 106a-106n. Other engagement signals may include commentaries (e.g., via social media or other platforms) about a particular action and/or portion of the second video 106. For example, if the particular action occurs and/or portion corresponds to a specific segment of the first-N segments 106a-106n, the concert scorer 134 may increase the score of the specific segment of the first-N segments 106a-106n.

The sports game scorer 136 may assign scores to the first-N segments 110a-110n. For example, the sports game scorer 136 may analyze the visual stream of the first-N segments 110a-110n to determine visual cues to determine whether a segment of the first-N segments 110a-110n is of relevance and assign a score accordingly. For example, the sports game scorer 136 may increase the score of a segment of the first-N segments 110a-110n if certain visual cues (e.g., players passing a ball or puck, players using their hands, famous sports star present, slow motion video indicating an exciting play, and/or feet to play with a ball, hockey sticks hitting a hockey puck, etc.) are present in the segment of the first-N segments 110a-110n. In contrast, the sports game scorer 136 may decrease the score of a segment of the first-N segments 110a-110n if certain visual cues (e.g., ball rolling out of bounds, player injured, etc.) are present in the segment of the first-N segments 110a-110n.

Furthermore, the fourth video 110 may have an audio feed. The sports game scorer 136 may increase the score of a segment of the first-N segments 110a-110n if certain audio cues (e.g., a specific phrase such as "goal," audience cheering, etc.) are present in the segment of the first-N segments 110a-110n. The sports game scorer 136 may decrease the score of a segment of the first-N segments 110a-110n if certain audio cues (e.g., commercial associated music, etc.) are present in the segment of the first-N segments 110a-110n.

In some examples, the sports game scorer 136 may also identify engagement signals associated with the fourth video 110. For example, the plurality of engagement signals is associated with actions of a plurality of viewers that viewed the fourth video 110. If a certain number of viewers skip and/or bypass a portion of the fourth video 110, the sports game scorer 136 may reduce the score of segment(s) of the first-N segments 110a-110n included in the portion. In contrast, if a certain number of users rewind a portion of the fourth video 110, the sports game scorer 136 may increase scores of segments of the first-N segments 110a-110n within the portion. Furthermore, if a certain number of users jump to a specific segment of the first-N segments 110a-110n, the sports game scorer 136 may increase the score of the segment of the first-N segments 110a-110n. Other engagement signals may include commentaries (e.g., via social media or other platforms) about a particular action and/or portion of the fourth video 110. For example, if the particular action occurs and/or portion corresponds to a specific segment of the first-N segments 110a-110n, the sports game scorer 136 may increase the score of the specific segment of the first-N segments 110a-110n.

Thus, the process 100 assigns scores 124 as described above. For example, the first segment 108a has a score of 0.1, the N segment 108n has a score of 0.4, the first segment 104a has a score of 0.5, the N segment 104n has a score of 0.8, the first segment 106a has a score of 0.7, the N segment 106n has a score of 0.4, the first segment 110a has a score of 0.8 and the N segment 110n has a score of 0.3.

The process 100 then provides subsets of videos 126 (e.g., the first video 104, the second video 106, the third video 108 and the fourth video 110) based on the scores. Turning now to FIG. 1C, a plurality of user devices 142, 144, 146, 148, 150 are illustrated. Each of the user devices 142, 144, 146, 148, 150 may be associated with a different user.

For example, the process may provide a second segment 108b, the fifth segment 108e and the sixth segment 108f to the user device 142 based on the scores. Some embodiments may further consider other factors (e.g., duration of time that a requesting user is available, an interest profile of the requesting user, etc.) when determining that the second segment 108b, the sixth segment 108f and the fifth segment 108e are to be provided. The second segment 108b, the sixth segment 108f and the fifth segment 108e are provided and displayed on the user device 142 in chronological order.

The process 100 may provide the fifth segment 108e to the user device 144 based on the scores. In this example, a user of the user device 144 may have less available time than a user of the user device 142, and/or have an interest profile that indicates the user is likely to be uninterested in the second segment 108b and the sixth segment 108f. Thus, only one segment, the fifth segment 108e, is provided and the second segment 108b and the sixth segment 108f are bypassed for transmission to the user device 144 to conserve processing power and hardware resources.

Similarly, the first segment 106a and the third segment 106c are provided to and displayed on the user device 146 in chronological order. The fifth segment 110e, eighth segment 110h and N segment 110n are provided to and displayed on user device 148 in chronological order. The third segment 104c, the fourth segment 104d and ninth segment 104h are provided to and displayed on the user device 150 in chronological order.

Some embodiments include an AI model (e.g., deep learning models, neural network, Convolutional Neural Networks, etc.) and/or machine learning to implement process 100 to executed above. The process 100 may be implemented by a computing device, such as a server, computer, PC, mobile device, etc. (e.g., hardware, configurable logic, fixed-function logic hardware, at least one computer readable storage medium comprising a set of instructions for execution, etc.).

Thus, embodiments described herein efficiently segment a video and prioritize segments of the video via a crowd-sourced and content based analysis. Segments may be provided to a user based on the scores and additionally based on preferences of the user to enhance computing resource usage by reducing the amount of data that is needlessly transmitted.

Figure 2:
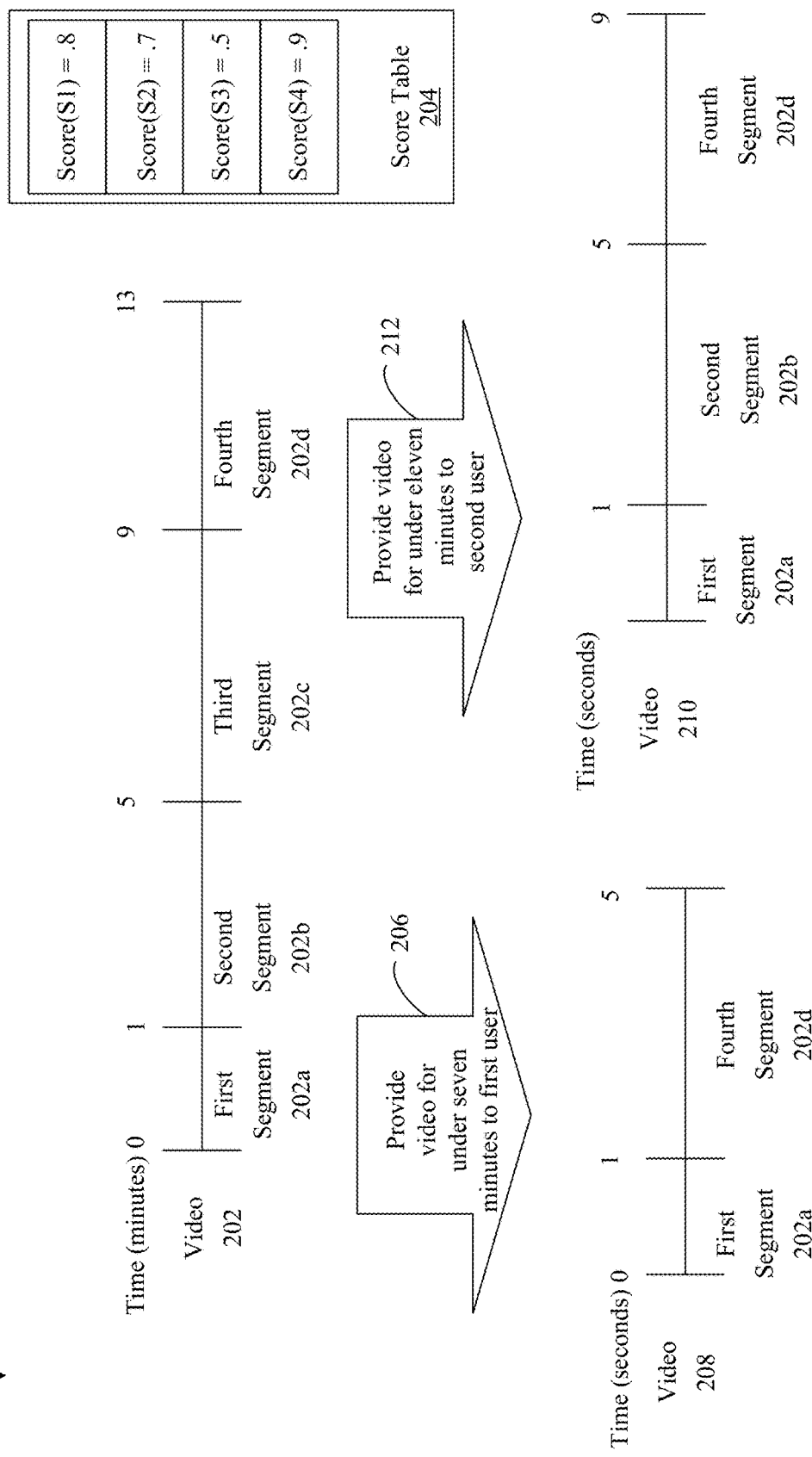
FIG. 2 is a process of an example of video segmentation and transmission process according to an embodiment.

FIG. 2 illustrates a video segmentation and transmission process 200. One or more aspects of process 200 may be implemented as part of and/or in conjunction with process 100 (FIGS. 1A-1C). A video 202 is divided into a series of first, second, third and fourth segments 202a, 202b, 202c, 202d similar to as described with respect to process 100 (FIGS. 1A-1C). As illustrated, the first segment 202a is one minute, the second segment 202b is four minutes, the third segment 202c is four minutes and the fourth segment 202d is 4 minutes. A score table 204 (e.g., a database structure) may maintain a list of the scores for the first, second, third and fourth segments 202a, 202b, 202c, 202d. The list of scores may be determined similar to as described with respect to process 100 (FIGS. 1A-1C). The first segment 202a has a score of 0.8, the second segment 202b has a score of 0.7, the third segment 202c has a score of 0.5 and the fourth segment 202d has a score of 0.9. In this example, the process 200 may utilize time constraints to determine which segments of the first-fourth segments 202a-202d are provided.

For example, the process 200 determines that a first user has seven minutes (which is a time constraint) available. For example, the process 200 may determine the available time of the first user based on a manual input from the first user, contextual hints and/or access to an electronic schedule (e.g., calendar, appointment reminder, etc.) of the first user. The process 200 may employ a "greedy" approach (e.g., knapsack algorithm, etc.) to determine the segments of the first-fourth segments 202a-202d should be transmitted. In such a greedy approach, the process 200 maximizes a sum of scores of the segments of the first-fourth segments 202a-202d that are provided to the first user, while also maintaining a total length of time of the segments to be under seven minutes. Thus, the process 200 may identify that based on the time constraint of seven minutes, a sum of the scores of the first segment 202a and the fourth segment 202d is the maximum possible value possible from the first-fourth segments 202a-202d.

As such, the process 200 provides the video 208 for under seven minutes to the first user 206. The video 208 is composed of the first segment 202a and fourth segment 202d.

Similarly, the process 200 determines that a second user has eleven minutes (which is a time constraint) available. For example, the process 200 may determine the available time of the second user based on a manual input from the second user, contextual hints and/or access to an electronic schedule (e.g., calendar, appointment reminder, etc.) of the second user. The process 200 maximizes a sum of scores of the segments of the first-fourth segments 202a-202d that are provided to the second user, while also maintaining a total length of time of the segments to be under eleven minutes. Thus, the process 200 may identify that based on the time constraint of eleven minutes, a sum of the scores of the first segment 202a, the second segment 202b and the fourth segment 202d is the maximum possible value possible from the first-fourth segments 202a-202d.

As such, the process 200 provides the video 210 for under eleven minutes to the second user 212. The video 210 is composed of the first segment 202a, the second segment 202b and the fourth segment 202d.

Figure 3:
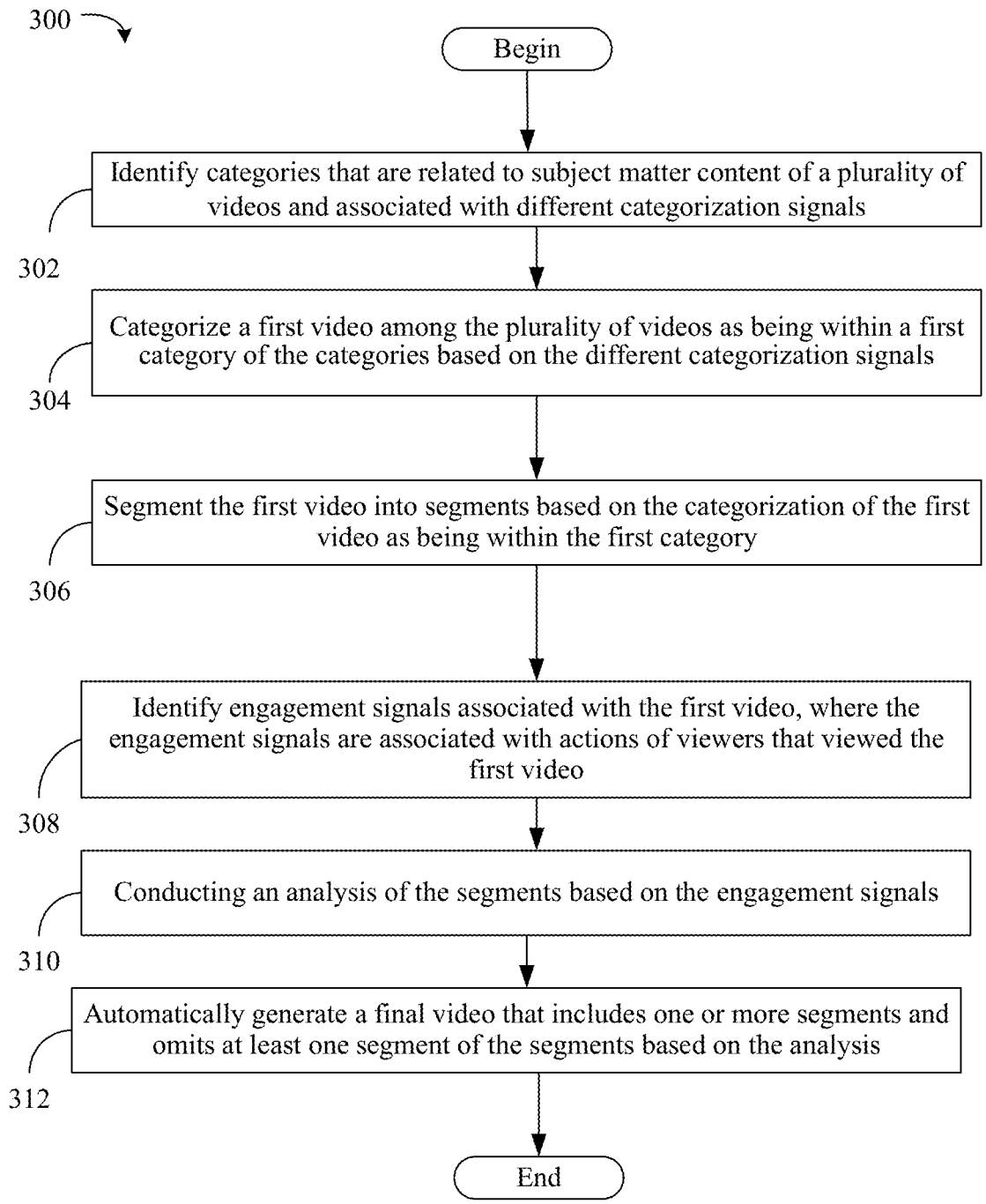
FIG. 3 is a flowchart of an example of a method of segmenting a video and providing segments to a user according to an embodiment.

FIG. 3 illustrates a method 300 to segment a video and provide segments to a user. One or more aspects of method 300 may be implemented as part of and/or in conjunction with process 100 (FIGS. 1A-1C) and process 200 (FIG. 2) already discussed. Method 300 may be implemented in a computing device, computing system (e.g., hardware, configurable logic, fixed-function logic hardware, at least one computer readable storage medium comprising a set of instructions for execution, etc.).

Illustrated processing block 302 identifies categories that are related to subject matter content of a plurality of videos and associated with different categorization signals. Illustrated processing block 304 categorizes a first video among the plurality of videos as being within a first category of the categories based on the different categorization signals. Illustrated processing block 306 segments the first video into segments based on the categorization of the first video as being within the first category. Illustrated processing block 308 identifies engagement signals associated with the first video, where the engagement signals are associated with actions of viewers that viewed the first video. Illustrated processing block 310 conducts an analysis of the segments based on the engagement signals. Illustrated processing block 312 automatically generates a final video that includes one or more segments and omits at least one segment of the segments based on the analysis.

In some examples, the method 300 further includes assigning a plurality of scores to the segments as part of the importance analysis. In such examples, the method 300 accesses an electronic schedule of a first user, identifies an indication of an amount of available time of the first user based on the electronic schedule and selects the one or more segments based on the amount of available time. In such examples, the method 300 identifies a duration of time of each respective segment of the segments, weights each respective segment of the segments based on the duration of time of the respective segment and a score of the plurality of scores assigned to the respective segment and selects the one or more segments based on the weights.

In some examples, the method 300 further includes identifying a first user node in a social graph, where the first user node is associated with a first user that is to receive the final video. The method 300 further includes identifying, from the social graph, one or more second user nodes, where actions of the first user indicate the first user has an affinity for one or more second users associated with the second user nodes, identifying one or more second user engagement signals associated with the second users viewing the first video and selecting the one or more the segments based on the one or more second user engagement signals.

In some examples, the method 300 further includes generating an interest profile of a first user based on previous actions of the first user, where the first user is to receive the final video and selecting the one or more the segments based on the interest profile of the first user. The method 300 further includes generating the interest profile based on previous search queries of the first user, a viewing history of the first user and electronic comments of the first user.

Figure 4:
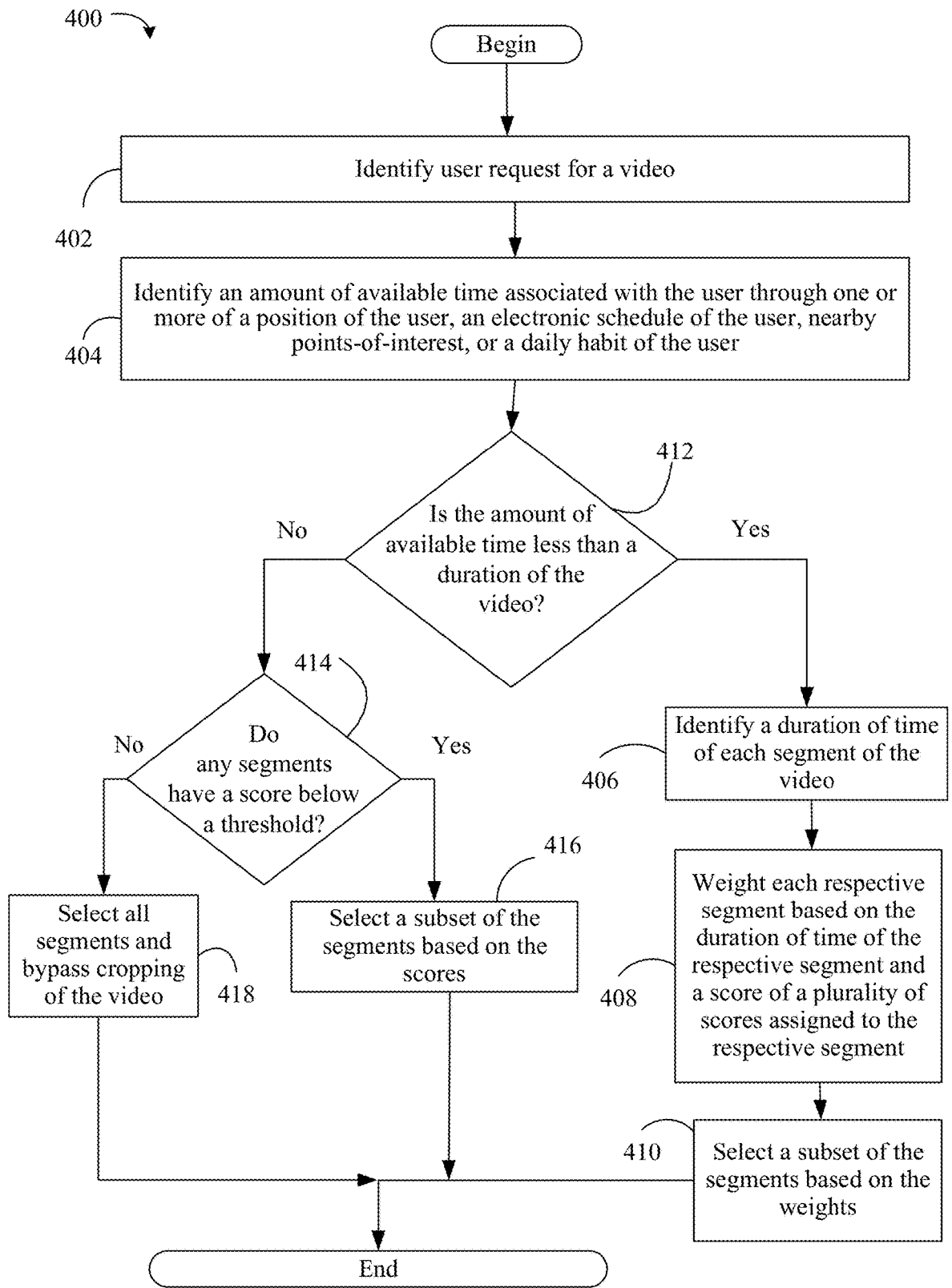
FIG. 4 is a flowchart of an example of a method of determining an available time of a user to provide segments to a user according to an embodiment.

FIG. 4 illustrates a method 400 of determining an available time of a user to provide segments to a user. One or more aspects of method 400 may be implemented as part of and/or in conjunction with process 100 (FIGS. 1A-1C), process 200 (FIG. 2) and/or method 300 (FIG. 3) already discussed. Method 400 may be implemented in a computing device, computing system (e.g., hardware, configurable logic, fixed-function logic hardware, at least one computer readable storage medium comprising a set of instructions for execution, etc.).

Illustrated processing block 402 identifies a user request for a video. Illustrated processing block 404 identifies an amount of available time associated with the user through one or more of a position of the user, an electronic schedule of the user, nearby points-of-interest, or a daily habit of the user.

For example, an approximate amount of time may be identified from a position of the user. The position of the user may be indicative of whether the user is available for a longer period of time (e.g., at home, in transit, etc.) or a short period of time (e.g., in a restaurant, at work, at a sports event, etc.). The approximate amount of time may be determined from nearby points-of-interest (POI). For example, a POI may be indicative of whether the user is available for a short period of time (e.g., near a POI that the user frequents). The available time may be set to a first default amount of time when the user is approximately available for a short period and a second default period of time when the user is approximately available for a long period of time, where the second default period of time is longer than the first default period of time.

In some examples, the exact, or nearly exact, amount of available time the user is available may be identified. For example, an electronic schedule of the user (e.g., a calendar with appointments, a restaurant reservation schedule, travel schedule) may be identified. The exact amount of time may be identified by determining an amount of time before a next appointment is scheduled. A daily habit of the user may similarly be identified based on a historical analysis of the user over time. For example, a user may enter data into a social network that identifies activities of the user. The data may be analyzed for trends or habits and used to predict when the user will engage in an activity. The amount of time available may thus be calculated based on when the activity is predicted to begin.

Illustrated processing block 412 then determines if the amount of available time is less than a duration of the video. If so, illustrated processing block 406 identifies a duration of time of each segment of the video. Illustrated processing block 408 weights each respective segment based on the duration of time of the respective segment and a score of a plurality of scores that is assigned to the respective segment. Longer segments may have reduced weights (e.g., lower priority) for occupying excessive time, while shorter segments may have greater weights (e.g., higher priority) for occupying relatively low time. For example, a high score of a longer segment may be offset by a longer length of the segment to produce a relatively small weight. A shorter segment that has a medium score but is short may be prioritized by increasing the weight. Thus, the weight corresponds to a likelihood that a segment will be selected. In this example, it is more likely that the shorter segment will be selected for transmission to the user as opposed to the longer segment.

Illustrated processing block 410 selects a subset of segments based on the weights, and to maximize a total sum of the weights of the subset of the segments. As noted, the weights may increase when a segment has a higher score and/or shorter length, and decreased when a segment has a longer length and/or lower score.

If illustrated processing block 412 determines that the amount of available time is greater than a duration of the first video, illustrated processing block 414 determines if any of the segments score below a threshold. The threshold may correspond to a minimum level of interest to justify preparation and transmission of a segment. If not, illustrated processing block 418 selects all segments and bypasses cropping of the video. Otherwise, processing block 416 selects a subset of the segments based on the scores, and to bypass transmission of any segment that falls below the threshold. While not illustrated, method 400 may transmit the selected segments (all or subset) to a user.

Figure 5:
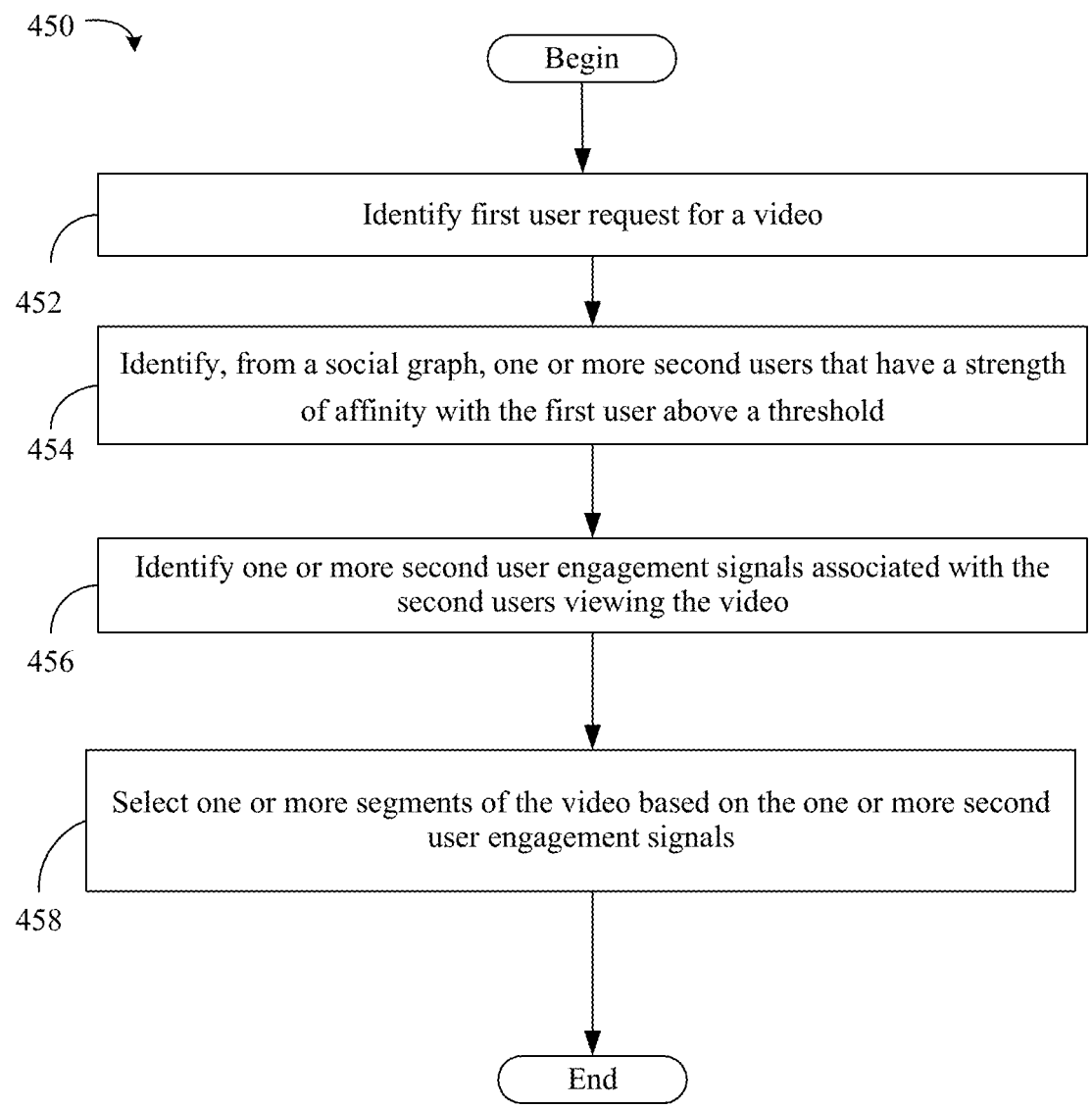
FIG. 5 is a flowchart of an example of a method of adjusting scores based on a personal network of a user according to an embodiment.

FIG. 5 illustrates a method 450 to adjust scores based on a personal network of a user. One or more aspects of method 450 may be implemented as part of and/or in conjunction with process 100 (FIGS. 1A-1C), process 200 (FIG. 2), method 300 (FIG. 3) and/or method 400 (FIG. 4) already discussed. Method 450 may be implemented in a computing device, computing system (e.g., hardware, configurable logic, fixed-function logic hardware, at least one computer readable storage medium comprising a set of instructions for execution, etc.).

Illustrated processing block 452 identifies a first user request for a video. Illustrated processing block 454 identifies, from a social graph, one or more second users that have a strength of affinity with the first user above a threshold. Thus, illustrated processing block 454 identifies friends and/or a community of a user (e.g., a personal network). That is, the first user is likely to share interests with the second users, thus some embodiments consider the actions of the second users when determining whether a first user will find the segments relevant.

Illustrated processing block 456 identifies one or more second user engagement signals (similar to as described above) associated with the second users viewing the video. Illustrated processing block 458 selects one or more segments of the video based on the one or more second user engagement signals. For example, some embodiments prioritize segments based on actions of a community (e.g., social network connections that share an affinity with the first user) of the first user. For example, some embodiments may generate scores of the segments based on the second engagement signals, and bypass and/or reduce the influence of other engagement signals of other users (not within the community) on the scores. Thus, the scores may be generated and fine tuned on a per-user basis.

Figure 6:
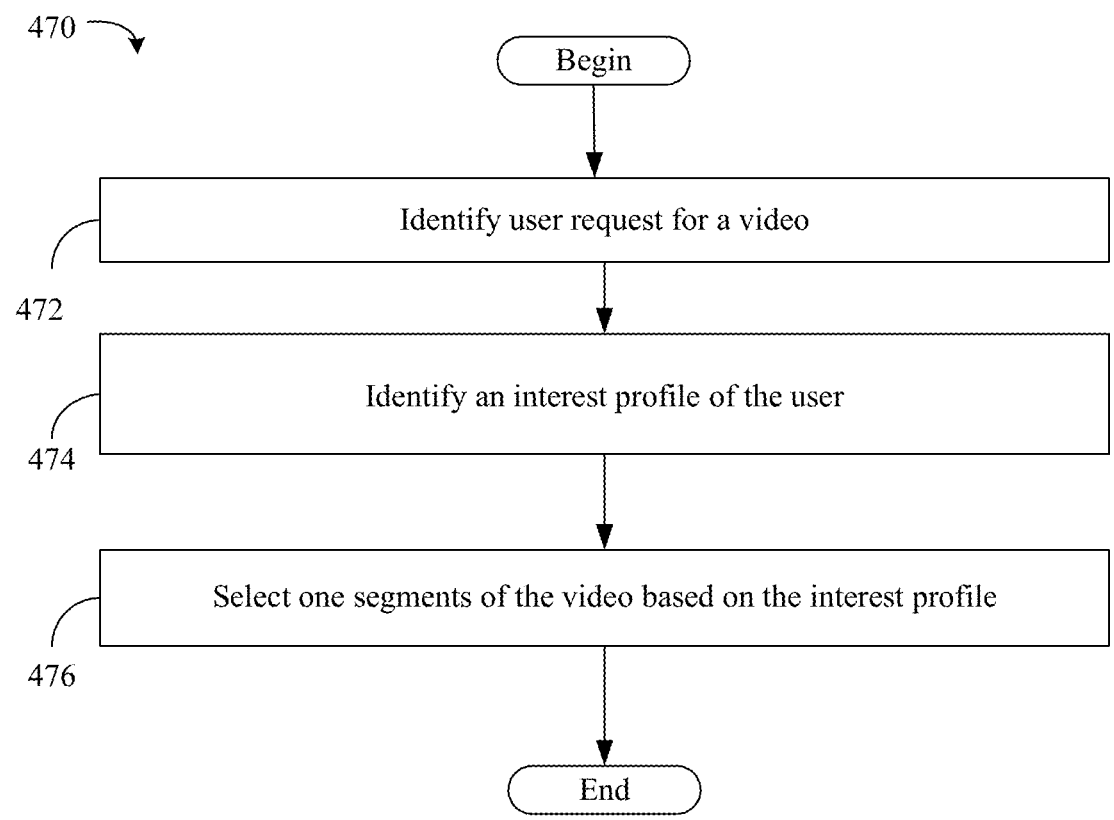
FIG. 6 is a flowchart of an example of a method of prioritizing segments based on an interest profile of a user according to an embodiment.

FIG. 6 illustrates a method 470 for prioritizing segments based on an interest profile of a user. One or more aspects of method 470 may be implemented as part of and/or in conjunction with process 100 (FIGS. 1A-1C), process 200 (FIG. 2), method 300 (FIG. 3), method 400 (FIG. 4) and/or method 450 (FIG. 5) already discussed. Method 450 may be implemented in a computing device, computing system (e.g., hardware, configurable logic, fixed-function logic hardware, at least one computer readable storage medium comprising a set of instructions for execution, etc.).

Illustrated processing block 472 identifies a user request for a video. Illustrated processing block 474 identifies an interest profile of the user. The interest profile includes interests of the user and may be generated through machine learning and/or inputs from the user. For example, a user search history may indicate preferences of the user. The user search history may indicate that a user searches for news on a particular sports team, band, sports player, etc. frequently, which indicates an interest or affinity for the same. A user may also comment on social platforms in a way that indicates a preference for a certain activity, player, etc. Thus, the interest profile may be a historical database indicating a user's preferences based on selections, comments, and actions in the past. Illustrated processing block 476 select one segments of the video based on the interest profile. For example, scores may be generated and/or adjusted based on the interest profile. Some embodiments may generate weights from the scores and the internet profile that are then used to select the one segment (e.g., a segment that includes and/or is related to a user's preference).

Figure 7:
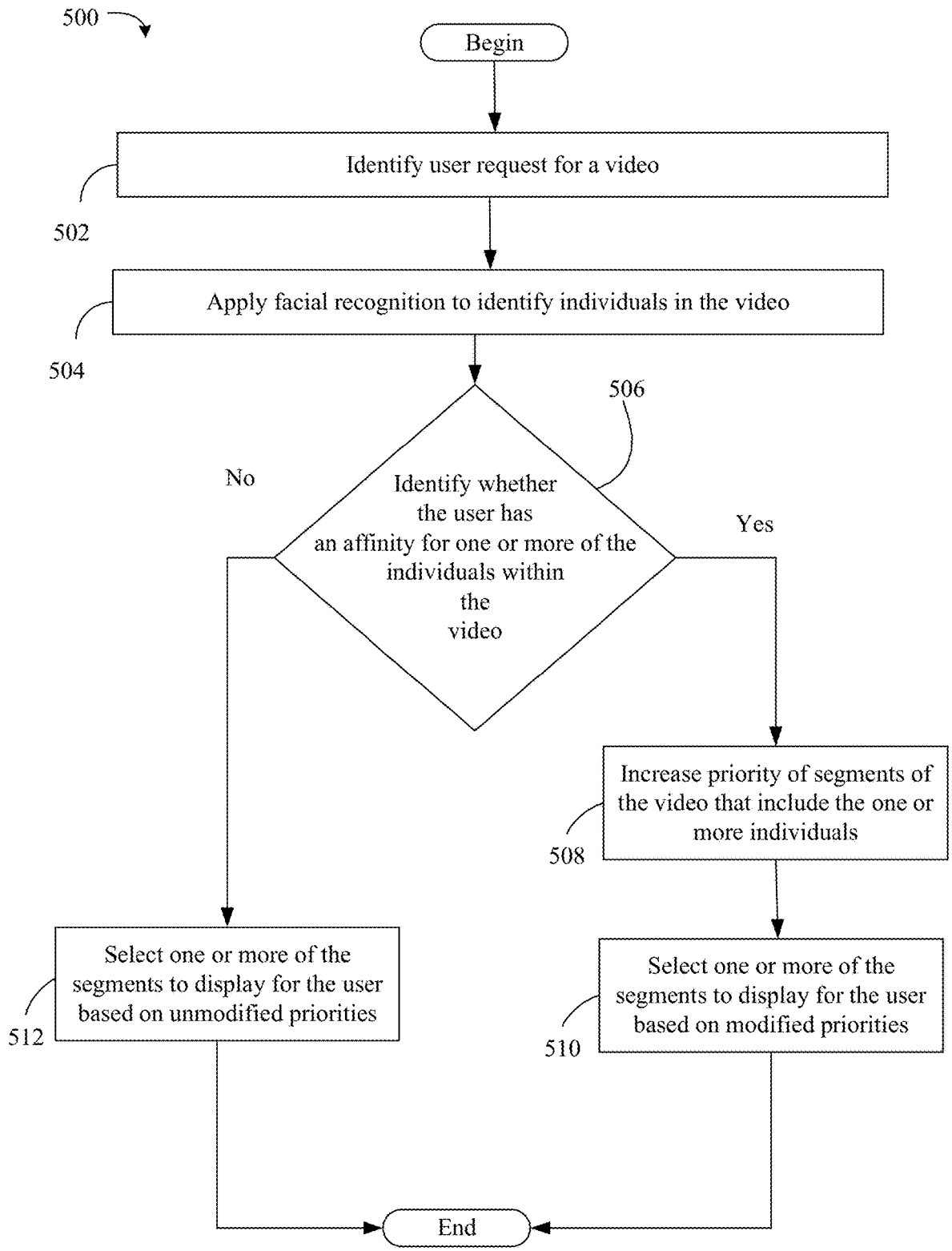
FIG. 7 is a flowchart of an example of a method of prioritizing segments based on facial recognition according to an embodiment.

FIG. 7 illustrates a method 500 for prioritizing segments based on facial recognition. One or more aspects of method 500 may be implemented as part of and/or in conjunction with process 100 (FIGS. 1A-1C), process 200 (FIG. 2), method 300 (FIG. 3), method 400 (FIG. 4), method 450 (FIG. 5) and/or method 470 (FIG. 6) already discussed. Method 500 may be implemented in a computing device, computing system (e.g., hardware, configurable logic, fixed-function logic hardware, at least one computer readable storage medium comprising a set of instructions for execution, etc.).

Illustrated processing block 502 identifies a user request for a video. Illustrated processing block 504 applies facial recognition to identify individuals in a video. Illustrated processing block 506 identifies whether the user has an affinity for one or more of the individuals within the video (e.g., is friends with an individual, related to the individual, etc.). Processing block 506 accesses a social graph to determine the affinities. If so, illustrated processing block 508 increases the priority of segments (e.g., increase a weight of the segments, increase a score, etc.) of the video that include the one or more individuals. Illustrated processing block 510 selects one or more of the segments to display for the user based on the modified priorities.

If illustrated processing block 506 determines that the user does not have an affinity for any of the users in the video, illustrated processing block 512 selects one or more of the segments to display for the user based on unmodified priorities.

Figure 8:
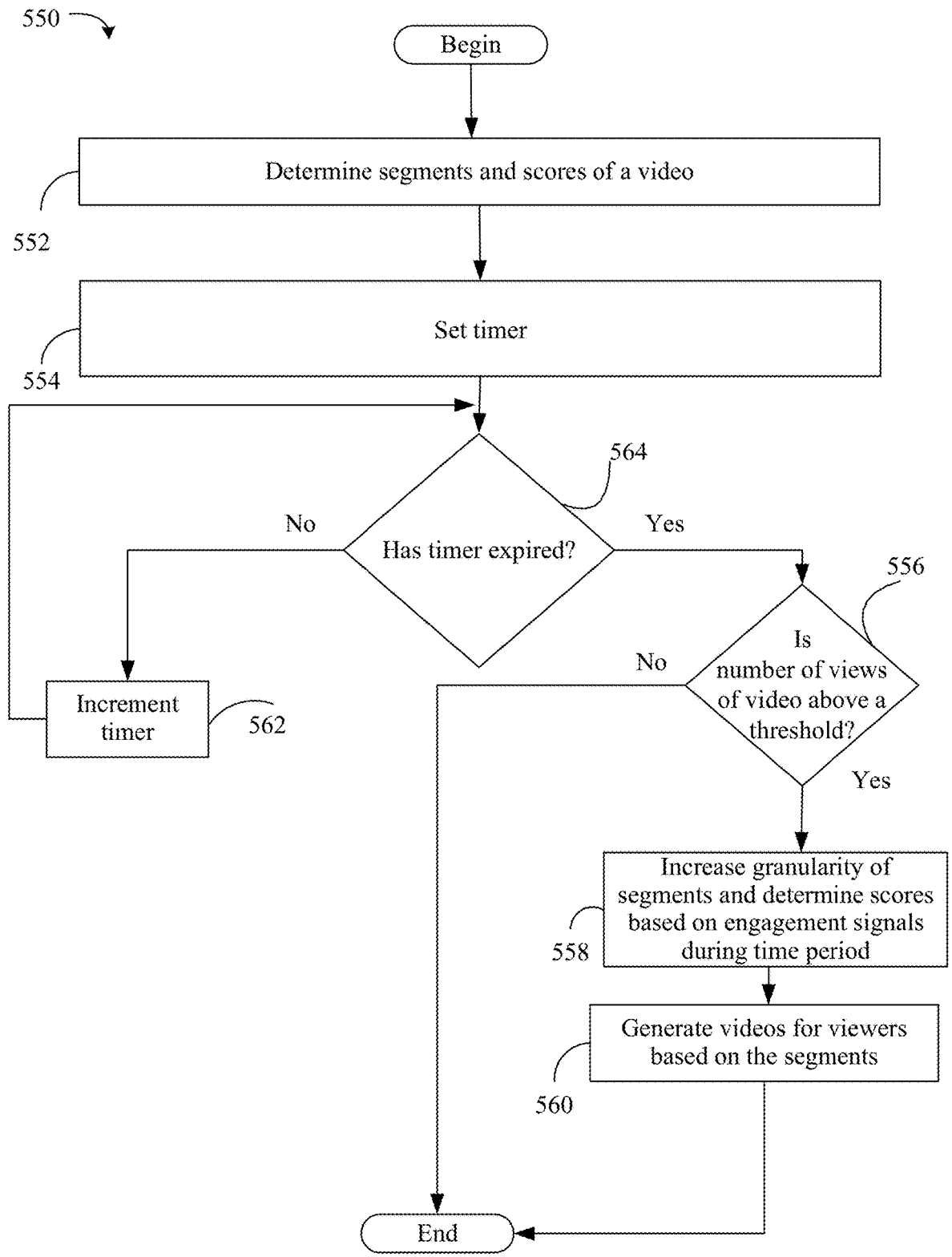
FIG. 8 is a flowchart of an example of a method of determining granularity of segments of videos according to an embodiment.

FIG. 8 illustrates a method 550 for determining granularity of segments of videos. One or more aspects of method 550 may be implemented as part of and/or in conjunction with process 100 (FIGS. 1A-1C), process 200 (FIG. 2), method 300 (FIG. 3), method 400 (FIG. 4), method 450 (FIG. 5), method 470 (FIG. 6) and/or method 500 (FIG. 7) already discussed. Method 550 may be implemented in a computing device, computing system (e.g., hardware, configurable logic, fixed-function logic hardware, at least one computer readable storage medium comprising a set of instructions for execution, etc.).

Illustrated processing block 552 determines segments and scores of a video. Illustrated processing block 554 sets a timer. Illustrated processing block 564 determines if the timer has expired. If not, illustrated processing block 562 increments the timer. Illustrated processing block 556 determines if a number of views of the video is above a threshold. If so, illustrated processing block 558 increases a granularity of segments (e.g., shortens) and determine scores based on engagement signals during time period. In doing so, popular videos may be shown in a more effective way to provide more focused highlights at a greater granularity and relevance. Illustrated processing block 560 generates videos for users based on the segments. If illustrated processing block 556 determines that the number of views is not above the threshold, the method 550 bypasses modifying the granularity of the video to avoid utilizing computing resources on less popular videos.

Figure 9:
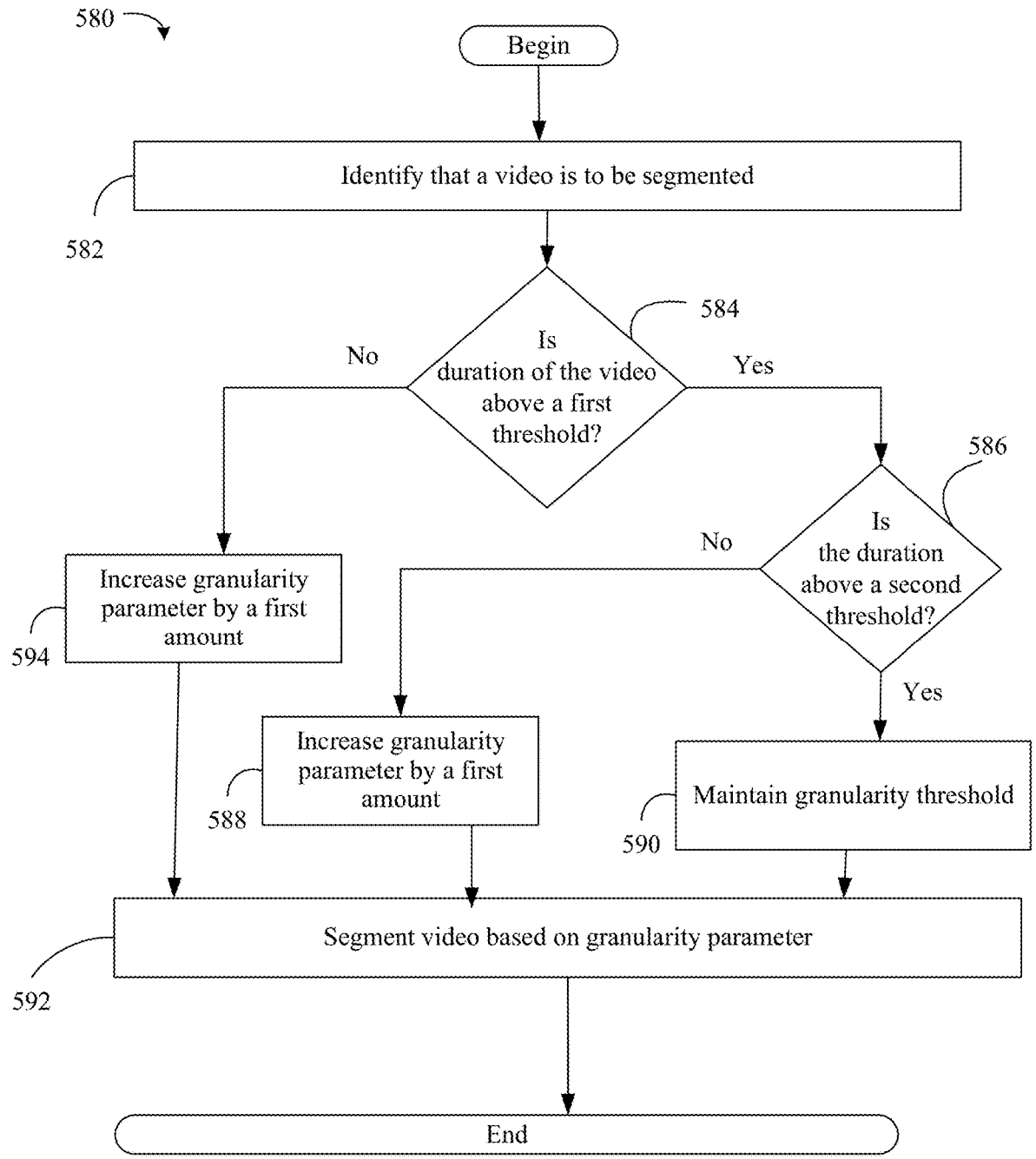
FIG. 9 is a flowchart of an example of a method of determining a granularity of video segmentation based on a length of a video according to an embodiment.

FIG. 9 illustrates a method 580 for determining a granularity of video segmentation based on length of a video. One or more aspects of method 580 may be implemented as part of and/or in conjunction with process 100 (FIGS. 1A-1C), process 200 (FIG. 2), method 300 (FIG. 3), method 400 (FIG. 4), method 450 (FIG. 5), method 470 (FIG. 6), method 500 (FIG. 7) and/or method 550 (FIG. 8) already discussed. Method 550 may be implemented in a computing device, computing system (e.g., hardware, configurable logic, fixed-function logic hardware, at least one computer readable storage medium comprising a set of instructions for execution, etc.).

Illustrated processing block 582 identifies that a video is to be segmented. Illustrated processing block 584 determines if the duration of the video is above a threshold. If not, illustrated processing block 594 increases a granularity parameter by a first amount (e.g., shortens segments). If so, illustrated processing block 586 determines if the duration is above a second threshold. If so, illustrated processing block 590 maintains the granularity parameter. If illustrated processing block 586 determines that the duration is not above the second threshold, illustrated processing block 588 increases the granularity parameter (shortens the segment length) by a second amount, where the second amount may be less than the first amount. For example, segment lengths, that are determined based on increasing the granularity parameter by the first amount, may be shorter than segment lengths that are determined based on increasing the granularity parameter by the second amount. Illustrated processing block 592 then segments the video based on the granularity parameter.

Figure 10:
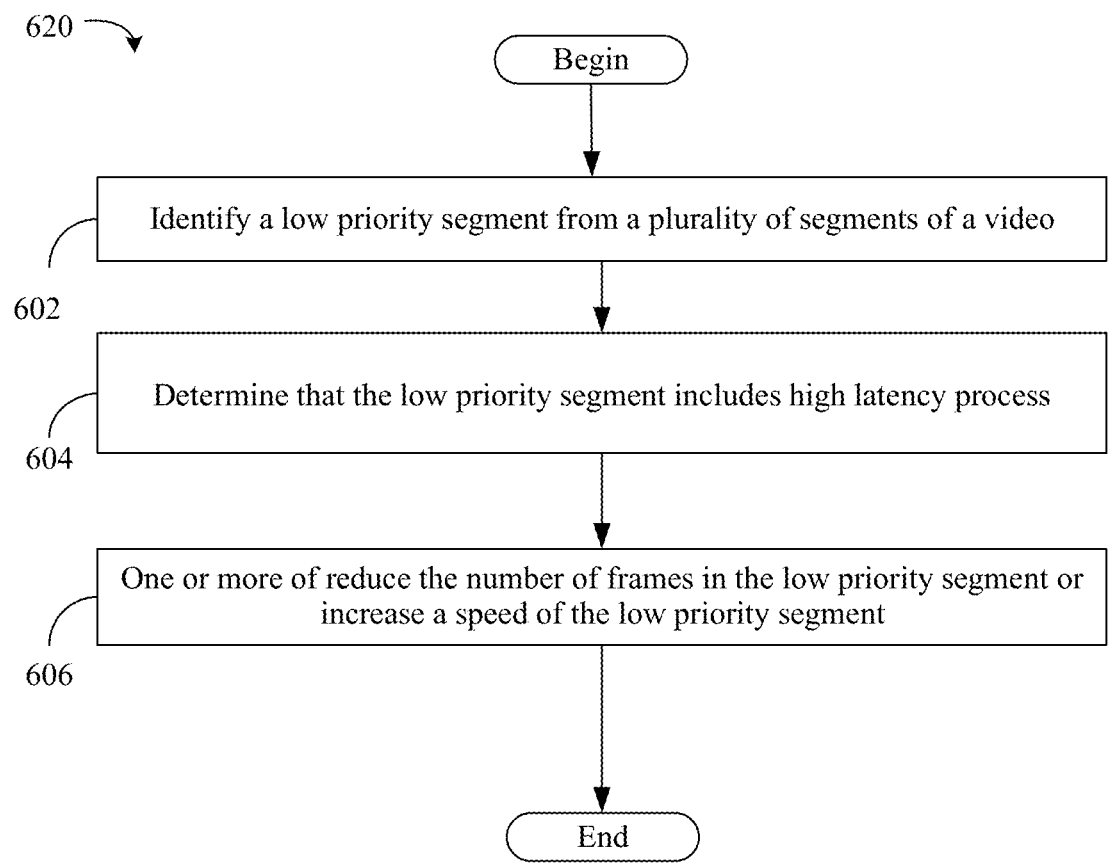
FIG. 10 is a flowchart of an example of a method of adjusting a speed and/or number of frames in a segment according to an embodiment.

FIG. 10 illustrates a method 620 to adjust a speed and/or number of frames in a segment. One or more aspects of method 620 may be implemented as part of and/or in conjunction with process 100 (FIGS. 1A-1C), process 200 (FIG. 2), method 300 (FIG. 3), method 400 (FIG. 4), method 450 (FIG. 5), method 470 (FIG. 6), method 500 (FIG. 7), method 550 (FIG. 8) and/or method 580 (FIG. 9) already discussed. Method 620 may be implemented in a computing device, computing system (e.g., hardware, configurable logic, fixed-function logic hardware, at least one computer readable storage medium comprising a set of instructions for execution, etc.).

Illustrated processing block 602 identifies a low priority segment (e.g., a low score) from a plurality of segments of a video. Illustrated processing block 604 determines that the low priority segment includes high latency process. Illustrated processing block 606 one or more of reduce the number of frames in the low priority segment or increases a speed of the low priority segment. Thus, segments that are low priority may be adjusted to fit within a time frame of a user by speeding up the segments or reducing the number of frames of the segments.

Figure 11:
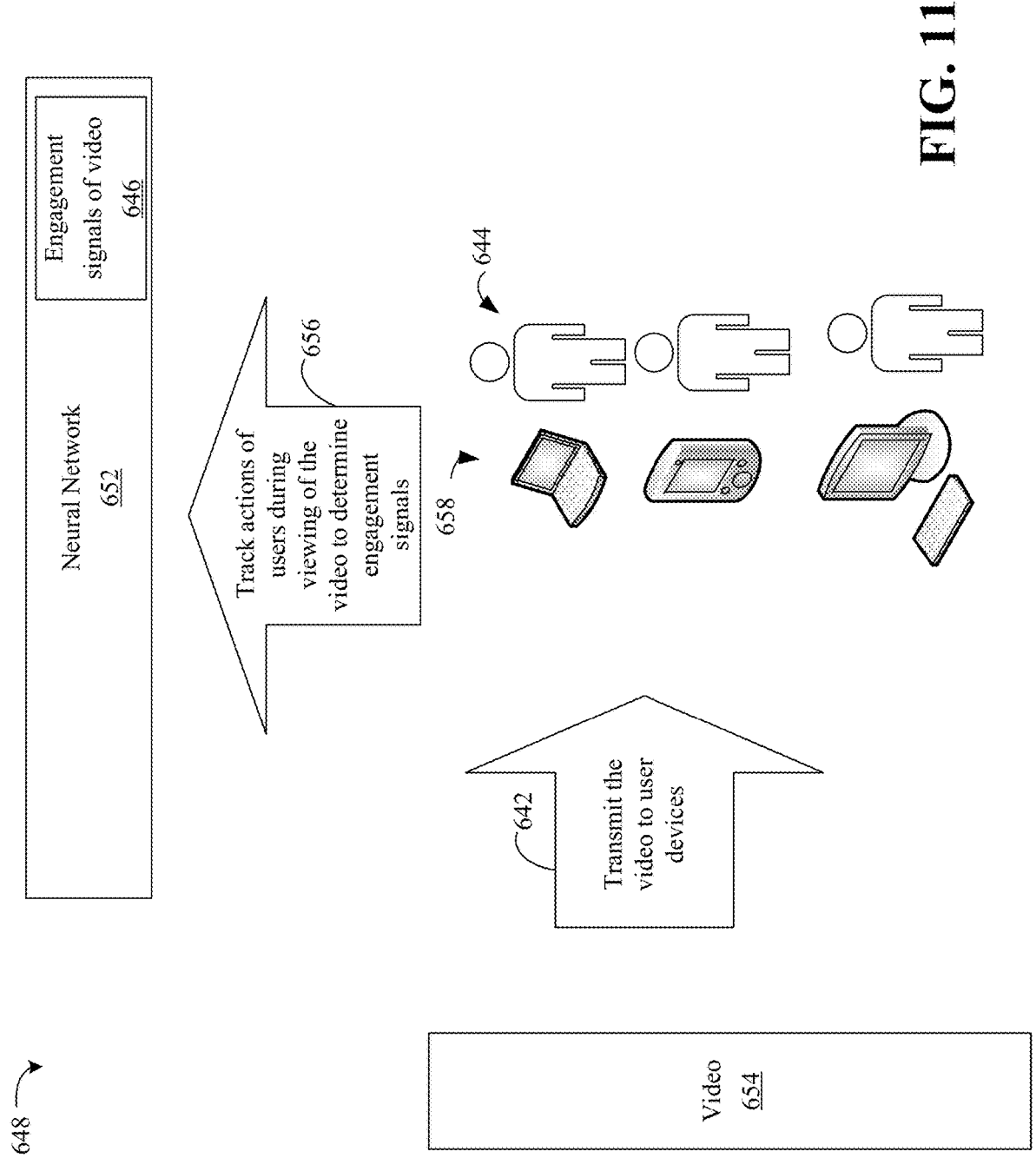
FIG. 11 is a process of an example of determining engagement signals of a video according to an embodiment.

FIG. 11 illustrates a process 648 to determine engagement signals of a video 654. One or more aspects of process 648 may be implemented as part of and/or in conjunction with process 100 (FIGS. 1A-1C), process 200 (FIG. 2), method 300 (FIG. 3), method 400 (FIG. 4), method 450 (FIG. 5), method 470 (FIG. 6), method 500 (FIG. 7), method 550 (FIG. 8), method 580 (FIG. 9) and/or method 620 (FIG. 10) already discussed. Process 648 may be implemented in a computing device, computing system (e.g., hardware, configurable logic, fixed-function logic hardware, at least one computer readable storage medium comprising a set of instructions for execution, etc.).

Process 648 transmits the video 654 to user devices 658, 642. The user devices 658 may be associated with users 644 who view and modify the video (e.g., skip portions, replay portions, etc.). The process 648 may track actions of users 644 during viewing of the video 654 to determine engagement signals 656. For example, neural network 652 may analyze the actions to generate engagement signals of the videos 646. Some examples may also include manual annotations to generate training data that is provided to the neural network 652.

Figure 12:
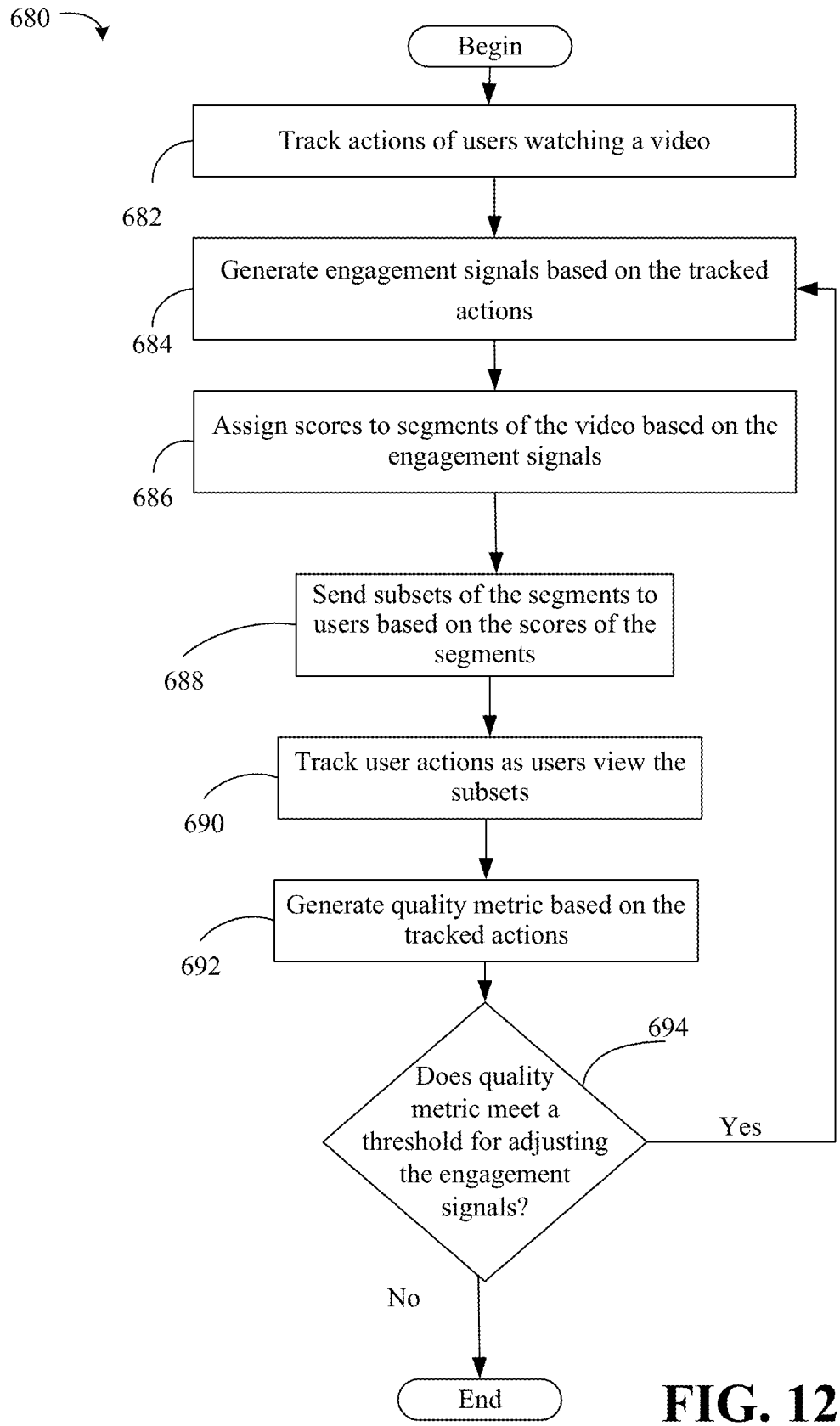
FIG. 12 is a flowchart of an example of a method of determining whether to rescore video segments according to an embodiment.

FIG. 12 illustrates a method 680 for determining whether to rescore video segments. One or more aspects of method 680 may be implemented as part of and/or in conjunction with process 100 (FIGS. 1A-1C), process 200 (FIG. 2), method 300 (FIG. 3), method 400 (FIG. 4), method 450 (FIG. 5), method 470 (FIG. 6), method 500 (FIG. 7), method 550 (FIG. 8), method 580 (FIG. 9), method 620 (FIG. 10) and/or process 648 (FIG. 11), already discussed. Method 680 may be implemented in a computing device, computing system (e.g., hardware, configurable logic, fixed-function logic hardware, at least one computer readable storage medium comprising a set of instructions for execution, etc.).

Illustrated processing block 682 tracks actions of users watching a video. Illustrated processing block 684 generates engagement signals based on the tracked actions. Illustrated processing block 686 assigns scores to segments of the video based on the engagement signals. Illustrated processing block 688 sends subsets of the segments to users based on the scores of the segments. Illustrated processing block 690 tracks user actions as users view the subsets. Illustrated processing block 692 generates quality metrics based on the tracked actions. The quality metrics may indicate whether users are skipping portions of the subsets, replaying certain segments, etc. If the quality metric meets the threshold (e.g., a significant amount of users are skipping portions of the video, replaying certain segments, searching for other segments that were not originally sent, etc.) Illustrated processing block 694 determines if the quality metric meets a threshold for adjusting the engagement signals. If so, illustrated processing block 684 executes again to redefine and score segments appropriately.

System Overview

Figure 13:
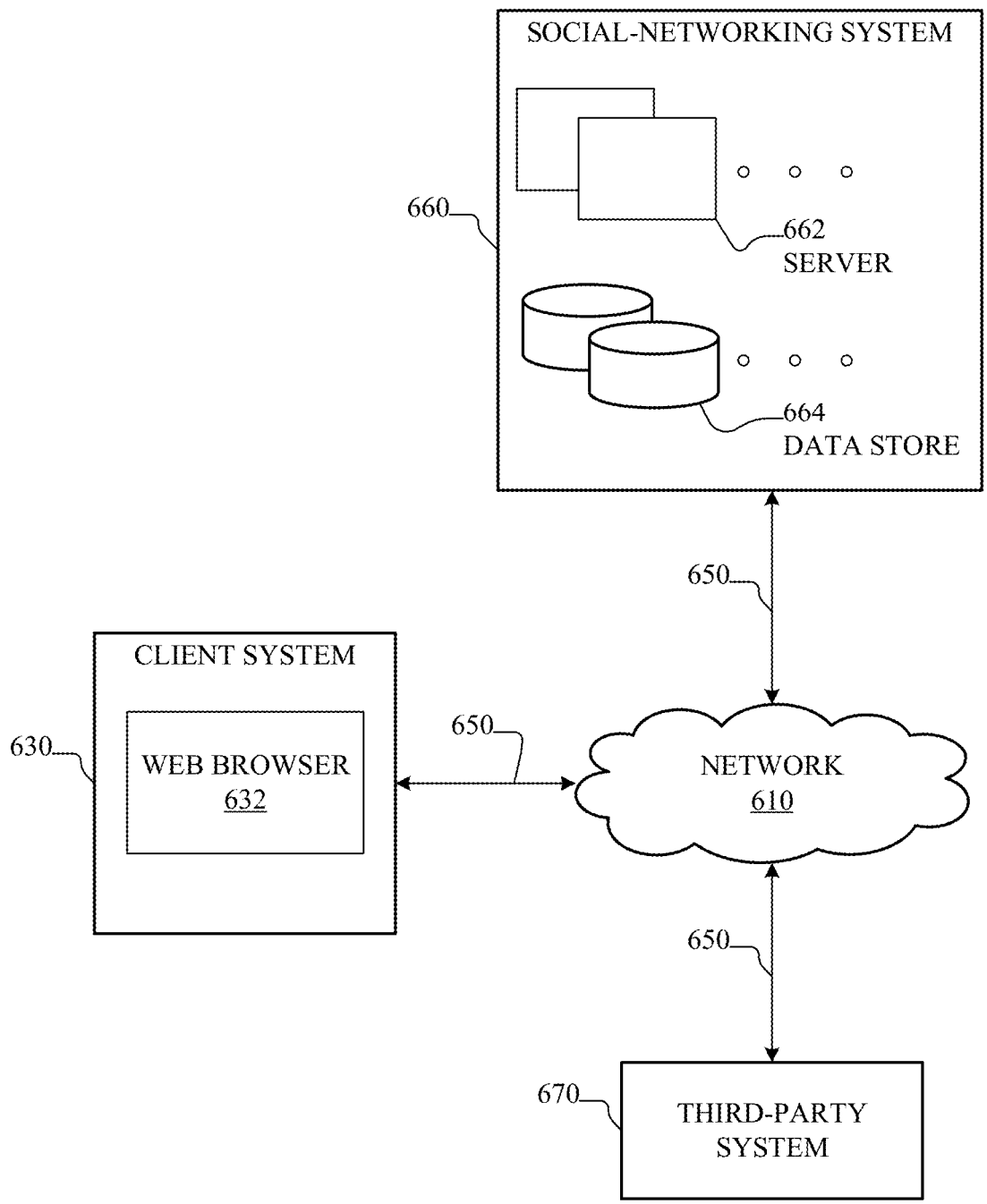
FIG. 13 illustrates an example network environment associated with a social-networking system according to an embodiment.

FIG. 13 illustrates an example network environment 600 associated with a social-networking system. Network environment 600 may implement one or more aspects of process 100 (FIG. 1), process 200 (FIG. 2), method 300 (FIG. 3), method 400 (FIG. 4), method 450 (FIG. 5), method 470 (FIG. 6), method 500 (FIG. 7), method 550 (FIG. 8), method 580 (FIG. 9), method 620 (FIG. 10), process 648 (FIG. 11) and/or method 680 (FIG. 12) already discussed.

Network environment 600 includes a client system 630, a social-networking system 660, and a third-party system 670 connected to each other by a network 610. Although FIG. 13 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 13 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 14:
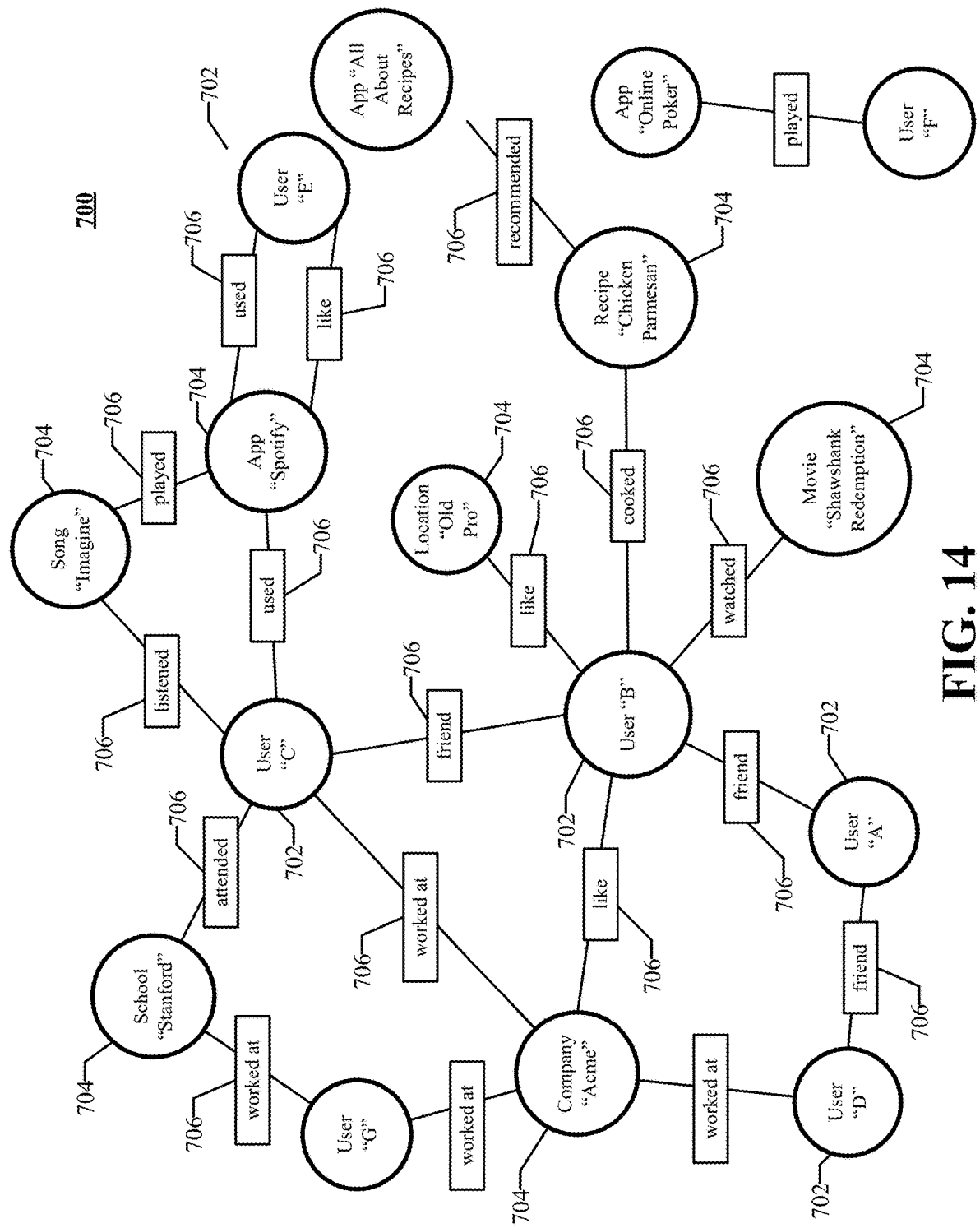
FIG. 14 illustrates an example social graph according to an embodiment.

FIG. 14 illustrates example social graph 700. In some embodiments, process 100 (FIG. 1), process 200 (FIG. 2), method 300 (FIG. 3), method 400 (FIG. 4), method 450 (FIG. 5), method 470 (FIG. 6), method 500 (FIG. 7), method 550 (FIG. 8), method 580 (FIG. 9), method 620 (FIG. 10), process 648 (FIG. 11) and/or method 680 (FIG. 12) already discussed may access social graph 700 to implement one or more aspects.

In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 14 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a web site (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 14, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 14, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 14) between user nodes 702 corresponding to the user and concept nodes 704 corresponding to the song and application to indicate that the user listened to the song and used the application. Moreover, social-networking system 660 may create a "played" edge 706 (as illustrated in FIG. 14) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 14 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Social Graph Affinity and Coefficient

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 704 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 15:
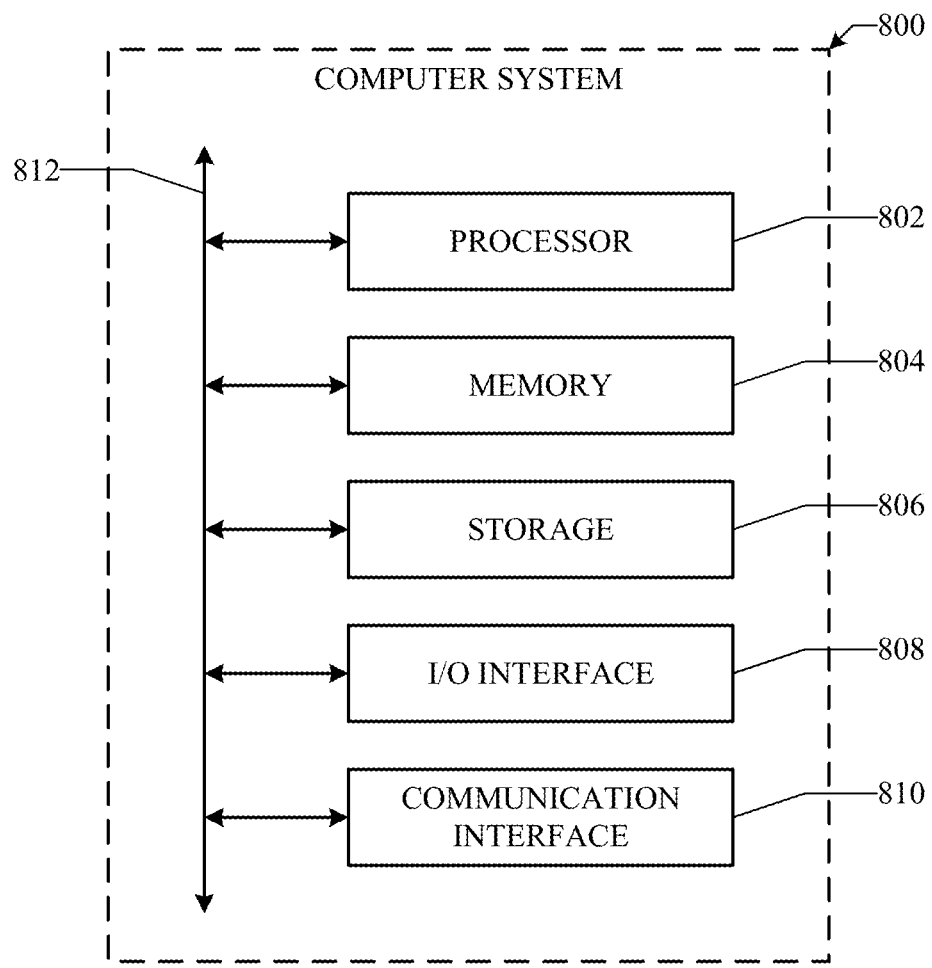
FIG. 15 illustrates an example computer system according to an embodiment.

FIG. 15 illustrates an example computer system 800. The system 800 may implement one or more aspects of process 100 (FIG. 1), process 200 (FIG. 2), method 300 (FIG. 3), method 400 (FIG. 4), method 450 (FIG. 5), method 470 (FIG. 6), method 500 (FIG. 7), method 550 (FIG. 8), method 580 (FIG. 9), method 620 (FIG. 10), process 648 (FIG. 11) and/or method 680 (FIG. 12) already discussed. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Thus, technology described herein may support a granular image enhancement selection process. The technology may substantially reduce the memory needed to store listings, the time needed to consummate a transaction and preserve valuable compute resources as well as bandwidth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. At least one non-transitory computer readable storage medium comprising a set of instructions, which when executed by a computing device, cause the computing device to:
   identify categories that are related to subject matter content of a plurality of videos and associated with different categorization signals;
   categorize a first video among the plurality of videos as being within a first category of the categories based on the different categorization signals;
   segment the first video into segments based on the categorization of the first video as being within the first category;
   identify engagement signals associated with the first video, wherein the engagement signals are associated with actions of viewers that viewed the first video;
   conduct an analysis of the segments based on the engagement signals;
   automatically generate a final video that includes one or more of the segments and omits at least one segment of the segments based on the analysis assign a plurality of scores to the segments based on the engagement signals;
   identify a duration of time of each respective segment of the segments;
   weight each respective segment of the segments based on the duration of time of the respective segment and a score of the plurality of scores assigned to the respective segment; and
   select the one or more of the segments based on the weights.

2. The at least one non-transitory computer readable storage medium of claim 1, wherein the instructions, when executed, cause the computing device to:
   access an electronic schedule of a first user;
   identify an indication of an amount of available time of the first user based on the electronic schedule; and
   select the one or more of the segments based on the amount of available time.

3. The at least one non-transitory computer readable storage medium of claim 1, wherein the instructions, when executed, cause the computing device to:
   generate an interest profile of a first user based on previous actions of the first user, wherein the first user is to receive the final video; and
   select the one or more of the segments of the final video based on the interest profile of the first user.

4. The at least one non-transitory computer readable storage medium of claim 3, wherein the instructions, when executed, cause the computing device to:
   generate the interest profile based on previous search queries of the first user, a viewing history of the first user and electronic comments of the first user.

5. At least one non-transitory computer readable storage medium comprising a set of instructions, which when executed by a computing device, cause the computing device to:
   identify categories that are related to subject matter content of a plurality of videos and associated with different categorization signals;
   categorize a first video among the plurality of videos as being within a first category of the categories based on the different categorization signals;
   segment the first video into segments based on the categorization of the first video as being within the first category;
   identify engagement signals associated with the first video, wherein the engagement signals are associated with actions of viewers that viewed the first video;
   conduct an analysis of the segments based on the engagement signals;
   automatically generate a final video that includes one or more of the segments and omits at least one segment of the segments based on the analysis;
   identify a first user node in a social graph, wherein the first user node is associated with a first user that is to receive the final video;
   identify, from the social graph, one or more second user nodes, wherein actions of the first user indicate the first user has an affinity for one or more second users associated with the second user nodes;
   identify one or more second user engagement signals associated with the second users viewing the first video; and
   select the one or more of the segments of the final video based on the one or more second user engagement signals.

6. A computer system comprising:
   one or more processors; and
   a memory coupled to the processors, the memory comprising instructions executable by the one or more processors, the one or more processors being operable when executing the instructions to cause the computer system to:
   identify categories that are related to subject matter content of a plurality of videos and associated with different categorization signals;
   categorize a first video among the plurality of videos as being within a first category of the categories based on the different categorization signals;
   segment the first video into segments based on the categorization of the first video as being within the first category;
   identify engagement signals associated with the first video, wherein the engagement signals are associated with actions of viewers that viewed the first video;
   conduct an analysis of the segments based on the engagement signals;
   automatically generate a final video that includes one or more of the segments and omits at least one segment of the segments based on the analysis;
   assign a plurality of scores to the segments based on the engagement signals;
   identify a duration of time of each respective segment of the segments;
   weight each respective segment of the segments based on the duration of time of the respective segment and a score of the plurality of scores assigned to the respective segment; and
   select the one or more of the segments based on the weights.

7. The computer system of claim 6, wherein the one or more processors are further operable when executing the instructions to cause the computer system to:
   access an electronic schedule of a first user;
   identify an indication of an amount of available time of the first user based on the electronic schedule; and
   select the one or more of the segments based on the amount of available time.

8. The computer system of claim 6, wherein the one or more processors are further operable when executing the instructions to cause the computer system to:
generate an interest profile of a first user based on previous actions of the first user, wherein the first user is to receive the final video; and
select the one or more of the segments of the final video based on the interest profile of the first user.

9. The computer system of claim 8, wherein the one or more processors are further operable when executing the instructions to cause the computer system to:
generate the interest profile based on previous search queries of the first user, a viewing history of the first user and electronic comments of the first user.

10. A computer system comprising:
one or more processors; and
a memory coupled to the processors, the memory comprising instructions executable by the one or more processors, the one or more processors being operable when executing the instructions to cause the computer system to:
identify categories that are related to subject matter content of a plurality of videos and associated with different categorization signals;
categorize a first video among the plurality of videos as being within a first category of the categories based on the different categorization signals;
segment the first video into segments based on the categorization of the first video as being within the first category;
identify engagement signals associated with the first video, wherein the engagement signals are associated with actions of viewers that viewed the first video;
conduct an analysis of the segments based on the engagement signals;
automatically generate a final video that includes one or more of the segments and omits at least one segment of the segments based on the analysis;
identify a first user node in a social graph, wherein the first user node is associated with a first user that is to receive the final video;
identify, from the social graph, one or more second user nodes, wherein actions of the first user that indicate the first user has an affinity for one or more second users associated with the second user nodes;
identify one or more second user engagement signals associated with the second users viewing the first video; and
select the one or more of the segments of the final video based on the one or more second user engagement signals.

11. A method comprising:
by a computer system:
identifying categories that are related to subject matter content of a plurality of videos and associated with different categorization signals;
categorizing a first video among the plurality of videos as being within a first category of the categories based on the different categorization signals;
segmenting the first video into segments based on the categorization of the first video as being within the first category;
identifying engagement signals associated with the first video, wherein the engagement signals are associated with actions of viewers that viewed the first video;
conducting an analysis of the segments based on the engagement signals;
automatically generating a final video that includes one or more of the segments and omits at least one segment of the segments based on the analysis;
assigning a plurality of scores to the segments based on the engagement signals;
identifying a duration of time of each respective segment of the segments;
weighting each respective segment of the segments based on the duration of time of the respective segment and a score of the plurality of scores assigned to the respective segment; and
selecting the one or more of the segments based on the weights.

12. The method of claim 11, further comprising:
accessing an electronic schedule of a first user;
identifying an indication of an amount of available time of the first user based on the electronic schedule; and
selecting the one or more of the segments based on the amount of available time.

13. The method of claim 11, further comprising:
generating an interest profile of a first user based on previous search queries of the first user, a viewing history of the first user and electronic comments of the first user, wherein the first user is to receive the final video; and
selecting the one or more of the segments of the final video based on the interest profile of the first user.

14. A method comprising:
by a computer system:
identifying categories that are related to subject matter content of a plurality of videos and associated with different categorization signals;
categorizing a first video among the plurality of videos as being within a first category of the categories based on the different categorization signals;
segmenting the first video into segments based on the categorization of the first video as being within the first category;
identifying engagement signals associated with the first video, wherein the engagement signals are associated with actions of viewers that viewed the first video;
conducting an analysis of the segments based on the engagement signals;
automatically generating a final video that includes one or more of the segments and omits at least one segment of the segments based on the analysis;
identifying a first user node in a social graph, wherein the first user node is associated with a first user that is to receive the final video;
identifying, from the social graph, one or more second user nodes, wherein actions of the first user indicate the first user has an affinity for one or more second users associated with the second user nodes;
identifying one or more second user engagement signals associated with the second users viewing the first video; and
selecting the one or more of the segments of the final video based on the one or more second user engagement signals.

* * * * *